(12) United States Patent
Kojima et al.

(10) Patent No.: US 9,987,597 B2
(45) Date of Patent: Jun. 5, 2018

(54) MICROPOROUS MEMBRANE AND MANUFACTURING PROCESS THEREFOR

(71) Applicants: JNC CORPORATION, Tokyo (JP); JNC PETROCHEMICAL CORPORATION, Tokyo (JP)

(72) Inventors: Osamu Kojima, Chiba (JP); Tadashi Nagasako, Chiba (JP); Osamu Yamaguchi, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 140 days.

(21) Appl. No.: 14/432,483

(22) PCT Filed: Oct. 1, 2013

(86) PCT No.: PCT/JP2013/076746
§ 371 (c)(1),
(2) Date: Aug. 11, 2015

(87) PCT Pub. No.: WO2014/054658
PCT Pub. Date: Apr. 10, 2014

(65) Prior Publication Data
US 2015/0328593 A1    Nov. 19, 2015

(30) Foreign Application Priority Data
Oct. 2, 2012    (JP) .................... 2012-220784

(51) Int. Cl.
*B01D 71/34*    (2006.01)
*B01D 67/00*    (2006.01)
(Continued)

(52) U.S. Cl.
CPC ....... *B01D 67/009* (2013.01); *B01D 67/0002* (2013.01); *B01D 69/02* (2013.01);
(Continued)

(58) Field of Classification Search
None
See application file for complete search history.

(56) References Cited

U.S. PATENT DOCUMENTS

| 4,539,256 A | 9/1985 | Shipman |
| 2003/0209486 A1 | 11/2003 | Kools |

(Continued)

FOREIGN PATENT DOCUMENTS

| CN | 1236842 | 1/2006 |
| EP | 0031836 | 10/1981 |

(Continued)

OTHER PUBLICATIONS

"Search Report of Europe Counterpart Application", dated Jul. 12, 2016, p. 1-p. 6.

(Continued)

*Primary Examiner* — Krishnan S Menon
(74) *Attorney, Agent, or Firm* — JCIPRNET

(57) ABSTRACT

Provided is a microporous membrane which has an asymmetric structure and which exhibits higher permeability while keeping a high particle rejection. This microporous membrane is an asymmetric microporous membrane that is provided with: a skin layer in which micropores have been formed; and a support layer which supports the skin layer and in which pores larger than the micropores have been formed. The material of the microporous membrane is a polyvinylidene fluoride-based resin. In the skin layer, multiple spherical bodies (1) are present, and multiple linear joining parts (2) extend three-dimensionally from each of the spherical bodies (1), each pair of adjacent spherical bodies (1) being linked to each other by one or more of the linear joining parts (2). Thus, the skin layer has a three-dimensional network structure wherein the spherical bodies (1) act as nodes.

9 Claims, 25 Drawing Sheets

(51) Int. Cl.
  *B01D 69/10* (2006.01)
  *B01D 69/02* (2006.01)
  *B01D 69/12* (2006.01)

(52) U.S. Cl.
  CPC ............ *B01D 69/10* (2013.01); *B01D 69/12* (2013.01); *B01D 71/34* (2013.01); *B01D 67/0016* (2013.01); *B01D 2323/46* (2013.01); *B01D 2325/02* (2013.01); *B01D 2325/022* (2013.01); *B01D 2325/34* (2013.01)

(56) References Cited

U.S. PATENT DOCUMENTS

| | | | |
|---|---|---|---|
| 2005/0058821 A1* | 3/2005 | Smith | B01D 67/0009 428/304.4 |
| 2006/0178480 A1 | 8/2006 | Tada et al. | |
| 2010/0221522 A1* | 9/2010 | Mrozinski | B01D 67/0011 428/315.5 |
| 2013/0281558 A1* | 10/2013 | Sawada | C08J 5/18 521/134 |

FOREIGN PATENT DOCUMENTS

| | | |
|---|---|---|
| EP | 2332639 | 6/2011 |
| JP | 2006-205067 | 8/2006 |
| JP | 2010-075851 | 4/2010 |
| JP | 2010-221218 | 10/2010 |
| JP | 2012-040464 | 3/2012 |
| JP | 2012-082396 | 4/2012 |
| WO | 2007/119850 | 10/2007 |
| WO | 2009097745 | 8/2009 |

OTHER PUBLICATIONS

"International Search Report (Form PCT/ISA/210)", dated Nov. 12, 2013, with English translation thereof, pp. 1-4, in which five of the listed references (WO2007/119850, JP2006-205067, JP2012-040464, JP2010-221218 and JP2012-082396) were cited.

"Office Action of China Counterpart Application" with English translation, dated Apr. 11, 2016, p. 1-p. 20.

"Office Action of China Counterpart Application," with machine English translation thereof, dated May 26, 2017, p. 1-p. 23. (accurate translation will be submitted upon the examiner's request.).

"Office Action of Taiwan Counterpart Application" with partial English translation thereof, dated Jan. 16, 2017, p. 1-p. 10.

"Office Action of Taiwan Counterpart Applioation," with partial English translation, dated Oct. 30, 2017, p. 1-p. 13.

\* cited by examiner

Example 1

Example 2

Example 3

Example 4

Example 5

Example 6

Example 7

Example 8

Comparative Example 1

Comparative Example 2

Comparative Example 3

Comparative Example 4

MICROPOROUS MEMBRANE AND MANUFACTURING PROCESS THEREFOR

CROSS-REFERENCE TO RELATED APPLICATION

This application is a 371 application of the international PCT application serial no. PCT/JP2013/076746, filed on Oct. 1, 2013, which claims the priority benefit of Japan application no. 2012-220784, filed on Oct. 2, 2012. The entirety of each of the above-mentioned patent applications is hereby incorporated by reference herein and made a part of this specification.

TECHNICAL FIELD

The present invention relates to a microporous membrane, in particular to a microporous membrane which is formed of a polyvinylidene fluoride-based resin and whose permeability has been considerably improved by its geometry.

BACKGROUND ART

As for a structure of microporous membrane, there are an asymmetric structure (asymmetric membrane) and a symmetric structure (symmetric membrane). An asymmetric membrane is a membrane where the cross-sectional configuration of the membrane at the surface and the underside are not symmetric (left in FIG. 25), and a symmetric membrane is a membrane where the cross-sectional configuration of the membrane at the surface and the underside are symmetric (right in FIG. 25). In an asymmetric membrane, the surface of the membrane consists of a minutely thin layer (functional layer) referred to as a skin layer (or compact layer), and the other major portion consists of a support layer which supports the skin layer. An asymmetric membrane is a single layer, and formed of an extremely thin skin layer on its surface and a support layer made of the same material as the skin layer which supports the skin layer. Conventionally, there have been measures in an asymmetric membrane when used as a filtration membrane, such as reducing the thickness of this skin layer (functional layer) or making a uniform layer to reduce filtration resistance (such as resistance to water flow).

As an example of an asymmetric membrane, Patent Document 1 discloses a porous resin layer of a single layer made of polyvinylidene fluoride. In FIG. 1, FIG. 3, FIG. 5, FIG. 7 and FIG. 9, the structural photos of the surface of porous resin layers made of polyvinylidene fluoride (i.e. the skin layer surface) are disclosed, and in FIG. 2, FIG. 4, FIG. 6, FIG. 8 and FIG. 10, the structural photos of the cross-section of the porous resin layers are disclosed.

However, since polyvinylidene fluoride is a polymer which is mechanically, thermally, and chemically stable, there has been a problem that it is less likely to be processed into microporous membranes. Therefore, pore formation methods of a membrane made of polyvinylidene fluoride involve forming cracks in the surface of the skin layer of the asymmetric membrane, or the use of pores formed by spherulites which are connected to each other in a skin layer. However, by either way, sufficient pores have not been provided, and high permeability (liquid permeability and the like) has not been achieved.

PRIOR ART DOCUMENT

Patent Document

Patent Document 1: Japanese Patent Application Publication No. 2010-75851 (JP 2010-75851 A)

SUMMARY OF THE INVENTION

Problem to be Solved by the Invention

Generally, microporous membranes are widely used as filtration membranes. It is required that filtration membranes increase a permeation amount while maintaining particle rejection rate depending on the filtering object. However, when porosity is increased to achieve higher permeation amount, a distribution of void spaces become non-uniform causing the occurrence of extremely large pores or a decrease in particle rejection rate due to cracks in the surface. On the other hand, when porosity is reduced to achieve higher particle rejection rate, a permeation amount is decreased. In this way, improvement in particle rejection rate and improvement in permeation amount are in a contrary relationship, and it is extremely difficult to further increase a permeation amount while maintaining the particle rejection rate.

Furthermore, the relation of particle rejection rate and a permeation amount is also influenced by a pore diameter distribution. Even if membranes have the same average pore diameters, maximum pore diameter of membranes having wider pore diameter distribution is larger than that of membranes with narrower pore diameter distribution. As a result, particle rejection rate decreases. At the same time, membranes having wider pore diameter distribution have multiple small pores, therefore, the permeation amount is not necessarily high. Thus, narrowing a pore diameter distribution is desirable to further increase a permeation amount while maintaining the particle rejection rate. However, in order to narrow a pore diameter distribution, it is generally necessary to make the size and shape of pores as uniform as possible, and it is extremely difficult to make such a membrane.

An object of the present invention is to provide a microporous membrane of an asymmetric structure made of polyvinylidene fluoride-based resin, having more uniform pore shape and size and higher permeability while maintaining the particle rejection rate, and a manufacturing method thereof.

Means for Solving the Problem

The inventors of the present invention have conducted intensive studies in an attempt to solve the above-mentioned problems. As a result, it has been discovered that a skin layer having a three-dimensional network structure composed of spherical bodies and linear joining parts and having more uniformly shaped pores can be formed by using a polyvinylidene fluoride-based resin as a material of the microporous membrane, and controlling the solution viscosity or the molecular weight. It has been discovered that a microporous membrane having such a structure in the skin layer shows unprecedented permeability while maintaining the particle rejection rate, and the present invention has been completed.

Microporous membrane according to the first aspect of the present invention, being an asymmetric membrane as shown in FIG. 1, for example, comprises: a skin layer where micropores are formed; and a support layer which supports the skin layer and in which pores larger than the micropores are formed, wherein a material of the microporous membrane is a polyvinylidene fluoride-based resin, wherein the skin layer has a plurality of spherical bodies 1 and a plurality of linear joining parts 2 extending three-dimensionally from each of the spherical bodies 1, and wherein the adjacent spherical bodies 1 are connected to each other by the linear joining parts 2 to form a three-dimensional network structure where the spherical bodies 1 serve as intersections.

FIG. 1 shows one example of the three-dimensional network structure of the present invention. FIG. 1 is a photo of a skin layer surface taken by a scanning electron microscope (SEM). Note that in the cross-section of a microporous membrane, "skin layer" is a layer with a thickness equal to the distance from the surface to the zone where macrovoids appear, and "support layer" is a layer with a thickness equal to a value obtained by subtracting a thickness of skin layer from a thickness of the entire microporous membrane. The "macrovoids" appear in a support layer of a microporous membrane, and are huge voids with a minimum size of several μm up to a maximum size almost equal to the thickness of the support layer. "Spherical bodies" are globes formed at intersections within the three-dimensional network structure of the present invention, are not limited to perfectly shaped globes, and also include almost globes.

Such configuration allows voids among spherical bodies to be divided by linear joining parts, and thus allows micropores having more uniform shape and size of voids to be formed easily in a microporous membrane as compared to a conventional microporous membrane without spherical bodies, resulting in the formation of a skin layer having excellent permeability. Linear joining parts play a role in cross-linking spherical bodies without possibility of spherical bodies falling off, and therefore, can prevent filtration media from contaminating filtrate. Furthermore, since spherical bodies are present at intersections within the three-dimensional network structure, when the microporous membrane of the present invention is used as a filtration membrane, they prevent the three-dimensional network structure from being destroyed due to pressure. In other words, pressure resistance is high. Moreover, due to the three-dimensional network structure made of spherical bodies and linear joining parts as shown in FIG. 1, the microporous membrane of the present invention have more void spaces in skin layer than conventional microporous membranes having similar pore diameters. Thus, pathways are maintained and void spaces are more homogeneously placed three-dimensionally leading to excellent permeability.

Since a polyvinylidene fluoride-based resin is used for a material of microporous membrane, the microporous membrane is mechanically, thermally and chemically stable. Additionally, a polyvinylidene fluoride-based resin has the advantage in that it is easy to be processed and also fabricated after the processing (for example, cutting and adhesion with other materials) as compared to other fluororesin.

The microporous membrane according to the second aspect of the present invention, in the microporous membrane according to the first aspect of the invention, has a frequency distribution where 45% or more of the particle diameters of the spherical bodies are within the ±10% range of an average particle diameter.

Such configuration allows spherical bodies in a skin layer to have a uniform particle diameter. As a result, void spaces with more uniform pore diameter are likely to be formed among spherical bodies.

The microporous membrane according to the third aspect of the present invention, in the microporous membrane according to the first aspect or the second aspect of the invention, has a frequency distribution where 35% or more of the lengths of the joining parts are within the ±30% range of an average length.

Such configuration allows spherical bodies in a skin layer to be dispersed more homogeneously. As a result, void spaces with a uniform pore diameter are likely to be formed among spherical bodies.

As for the microporous membrane according to the fourth aspect of the present invention, in the microporous membrane according to any one of the first aspect to the third aspect of the invention, the spherical bodies have an average particle diameter of 0.05 to 0.5 μm.

Such configuration allows micropores to be easily formed among spherical bodies by the spherical bodies having the average particle size within the range described above and the linear joining parts interconnecting the spherical bodies.

As for the microporous membrane according to the fifth aspect of the present invention, in the microporous membrane according to any one of the first aspect to the fourth aspect of the invention, as shown in FIG. 8, or 9, as for a solution of a polyvinylidene fluoride-based resin dissolved in a good solvent, a graph with shear rate as the abscissa and a reciprocal of viscosity of the solution as the ordinate includes a curve having an arc of convex upward.

With the above polyvinylidene fluoride-based resin, such configuration enables a microporous membrane with a skin layer having a three-dimensional network structure which is made of spherical bodies and linear joining parts cross-linking each of the spherical bodies, and where spherical bodies serve as intersections, to be formed easily.

As for the microporous membrane according to the sixth aspect of the present invention, in the microporous membrane according to any one of the first aspect to the fourth aspect of the invention, as shown in FIG. 8, or 9, as for a solution of 10 parts by weight of the polyvinylidene fluoride-based resin, 10 parts by weight of polyethylene glycol and 80 parts by weight of dimethylacetamide, a graph with shear rate as the abscissa and a reciprocal of viscosity of the solution as the ordinate can be approximately correlated by a quadratic function in the region of the shear rate of 40 per second or smaller with a quadratic coefficient of the quadratic function being smaller than $10^{-8}$.

With the above polyvinylidene fluoride-based resin, such configuration enables a microporous membrane with a skin layer having a three-dimensional network structure which is made of spherical bodies and linear joining parts cross-linking each of the spherical bodies, and where spherical bodies serve as intersections, to be formed easily.

As for the microporous membrane according to the seventh aspect of the present invention, in the microporous membrane according to the fifth aspect or the sixth aspect of the invention, a weight-average molecular weight (Mw) of the polyvinylidene fluoride-based resin is 600,000 to 1,200,000.

In such configuration, a polyvinylidene fluoride-based resin having a weight-average molecular weight of 600,000 or more can prevent a raw material solution from being absorbed into a substrate layer. A polyvinylidene fluoride-based resin having a weight-average molecular weight of 1,200,000 or less is preferred due to easy application during the membrane formation.

As for the microporous membrane according to the eighth aspect of the present invention, in the microporous membrane according to any one of the first aspect to the seventh aspect of the invention, a thickness of the skin layer is 0.5 to 10 μm, and a thickness of the support layer is 20 to 500 μm.

In such configuration, as a skin layer is a layer which removes impurities (functional layer) within an asymmetric membrane, it is preferred to make it thinner to minimize filtration resistance to the extent that the formation of a three-dimensional network structure where spherical bodies serve as intersections is not hindered. A support layer which is a major portion of a microporous membrane contributes little to the removal of impurities, however, an extremely thin skin layer breaks down on its own, therefore, the support layer sufficiently thicker than the skin layer can help avoid this problem.

The microporous membrane according to the ninth aspect of the present invention, in the microporous membrane according to any one of the first aspect to the eighth aspect of the invention, further comprises: a substrate layer which supports the support layer.

In such configuration, a substrate layer serving as a reinforcing material enables the microporous membrane to endure higher filtration pressure. Furthermore, the substrate layer can prevent the raw material solution of a resin as a material dissolved in a solvent from carelessly running out during the application for membrane formation. The substrate layer is effective especially for a raw material solution with low viscosity. Note that a portion of the support layer coexists with the substrate layer, and the boundary between both is not so clear. When the coexisting portion of support layer and substrate layer is too small, it is more likely that the support layer is peeled off from the substrate layer.

A method of manufacturing the microporous membrane according to the tenth aspect of the present invention, in the microporous membrane according to any one of the first aspect to the eighth aspect of the invention, comprises: an applying step where a raw material solution of the polyvinylidene fluoride-based resin dissolved in a good solvent is applied to the substrate layer or a support; and an immersing step where the substrate layer or the support and the applied raw material solution are immersed in a nonsolvent after the applying step.

Such configuration leads to a method of manufacturing a microporous membrane which is an asymmetric membrane and has a plurality of spherical bodies in the skin layer. The spherical bodies in the skin layer are cross-linked to each other by linear joining parts to form a three-dimensional network structure where spherical bodies serve as intersections. Since spherical bodies with more uniform size are dispersed more homogeneously, micropores in the skin layer are evenly dispersed, resulting in excellent permeability.

A method of manufacturing the microporous membrane according to the eleventh aspect of the present invention comprises: an applying step of applying a raw material solution of a polyvinylidene fluoride-based resin dissolved in a good solvent to a substrate layer or a support; and an immersing step, after the applying step, of immersing the substrate layer or the support and the applied raw material solution in a nonsolvent, wherein as for the raw material solution, a graph with shear rate as the abscissa and a reciprocal of viscosity of the solution as the ordinate includes a curve having an arc of convex upward.

In such configuration, since a polyvinylidene fluoride-based resin suitable for the formation of a three-dimensional network structure in the skin layer is used as a material, spherical bodies are cross-linked to each other by linear joining parts to easily form a three-dimensional network structure where the spherical bodies serve as intersections in the skin layer.

Effect of the Invention

The microporous membrane of the present invention has a plurality of spherical bodies and a three-dimensional network structure where the spherical bodies serve as intersections formed of the spherical bodies and linear joining parts which connect the spherical bodies to each other in the skin layer, thus, can achieve higher permeability while maintaining the particle rejection rate.

BEST MODE FOR CARRYING OUT THE INVENTION

The present application is based on Japanese Patent Application No. 2012-220784 applied on Oct. 2, 2012 in Japan. The content forms part thereof as the content of the present application. The invention will be more completely understood by the detailed description provided hereinafter. Further areas of applicability of the invention will become more apparent from the detailed description provided hereinafter. However, it should be understood that the detailed description and specific examples indicate desired embodiments of the invention, and are provided for the purpose of illustration only because it will be apparent to those skilled in the art that various modifications and variations can be made without departing from the spirit or scope of the invention from the detailed description. Applicants have no intention to present any described embodiments to the public, and among modifications and variations, the subject matter that may not be fallen within the scope of claims should also be part of the invention under the doctrine of equivalents.

Hereinafter, the embodiments of the invention will be explained with reference to drawings. In addition, an identical or similar symbol is attached to a mutually identical part or a corresponding part in each drawing, and an overlapped explanation is omitted. Moreover, the invention is in no way limited to embodiments as described below.

Figure 25:
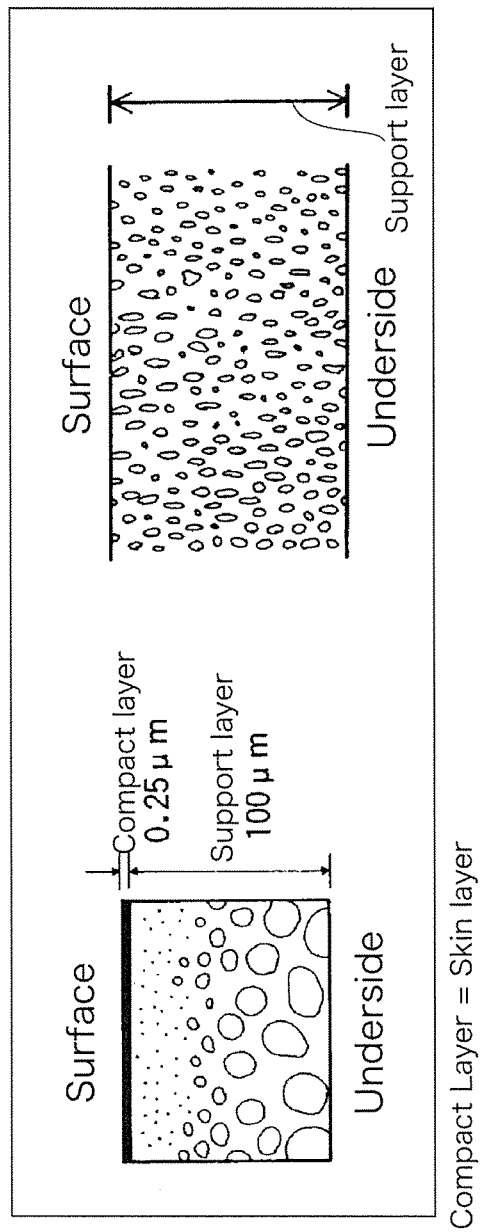
FIG. 25 is a schematic drawing showing a cross-sectional view of an asymmetric membrane (left) and a cross-sectional view of a symmetric membrane (right). (Source: Japan Patent Office Home Page, 1-6-2-1•Symmetric membrane and asymmetric membrane, Water treatment technology, 2005 Standard technology collection)

A microporous membrane of the first embodiment of the present invention will be described. The microporous membrane has an asymmetric structure having pore diameters varying in the thickness-wise direction of the membrane (See left in FIG. 25), and pore diameters are the smallest in the layer in the vicinity of the surface of the membrane (skin layer) and become larger toward the underside. The skin layer in the vicinity of the surface has pore diameters necessary for separation characteristics and serves as a functional layer. The rest of the membrane is a layer which serves as a support layer which has large pore diameters and small permeation resistance and maintains flow paths and membrane strength. The thickness of the skin layer is 0.5 to 10 μm, preferably 0.5 to 5 μm, and the thickness of the support layer is 20 to 500 μm.

Figure 1:
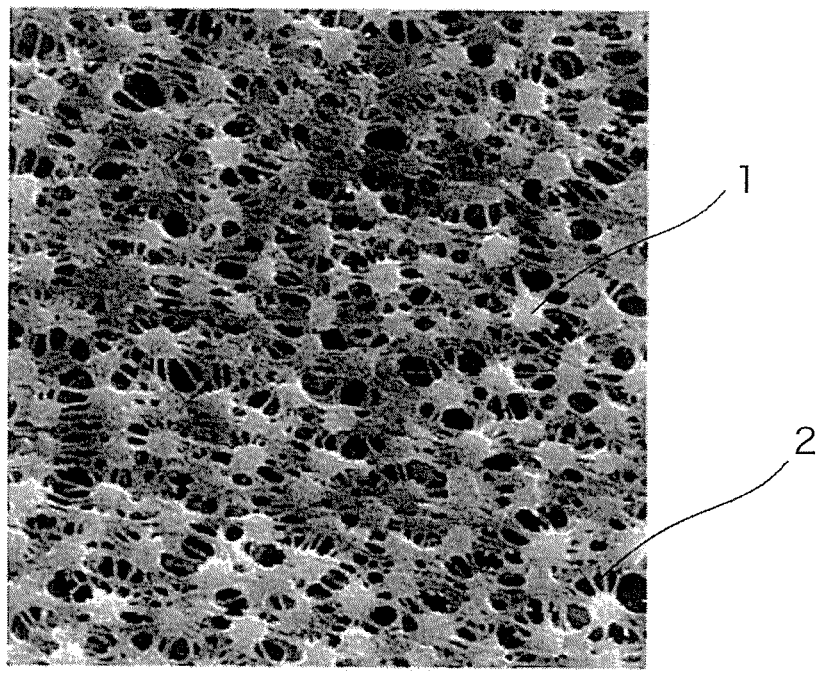
FIG. 1 is a photo of the skin layer surface of the microporous membrane of a first embodiment.

FIG. 1 is a portion of a photograph of the surface of the microporous membrane (skin layer side) of the first embodiment taken by a scanning electron microscope (SEM). As shown in FIG. 1, a skin layer has a plurality of spherical bodies 1, a plurality of linear joining parts 2 extend three-dimensionally from each of the spherical bodies 1, and the spherical bodies 1 adjacent to each other are connected by the linear joining parts 2 to form a three-dimensional network structure where the spherical bodies 1 serve as intersections and the resulting void spaces become pores. Therefore, pores are likely to be formed in the skin layer and these pores are less likely to be deformed. Since an asymmetric membrane has a minutely thin layer called skin layer which generally has a small number of pores, it is extremely effective to provide a larger number of pores which are less likely to be deformed in this layer in order to improve permeability. As for the microporous membrane of the first embodiment, permeability is substantially improved by the spherical bodies 1 and the linear joining parts 2 which connect each of the spherical bodies 1 in the skin layer. As a result, the microporous membrane according to the first embodiment can have higher permeability than conventional microporous membranes which have similar mean flow pore diameter. "Mean flow pore diameter" herein is a value determined by ASTM F316-86, and influences the rejection diameter to a large extent when a microporous membrane is used as a filtration membrane.

Furthermore, as shown in FIG. 1, the spherical bodies 1 have nearly uniform size, and are dispersed almost homogeneously. Therefore, constituted is the skin layer where the resulting void spaces formed among the spherical bodies 1 have uniform shape and size. The void spaces among the spherical bodies 1 are divided by the linear joining parts 2 which cross-link adjacent spherical bodies 1. As a result, the formed pores have an oval shape or an almost oval shape which does not have depressions in the periphery curve. Thus, the microporous membrane having uniform pore shape is formed.

Figure 2:
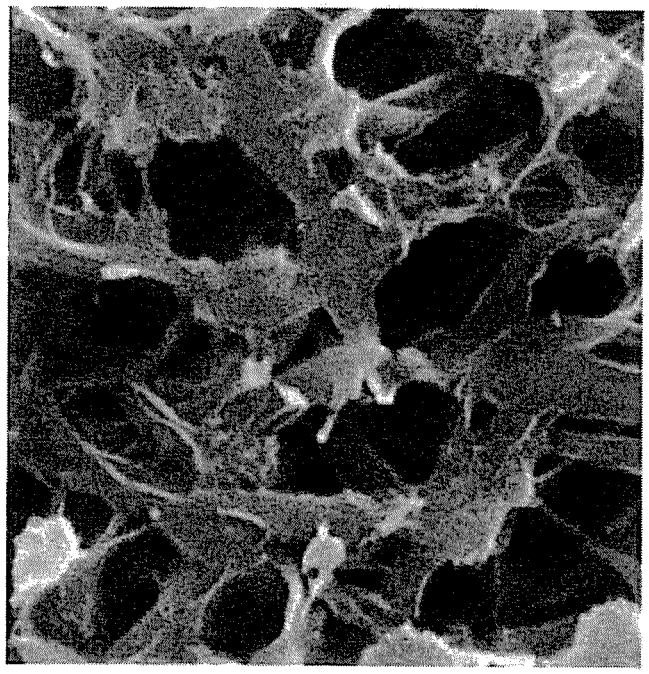
FIG. 2 is a photo of a conventional filtration membrane made of PVDF.

Even if a surface of a conventional filtration membrane made of polyvinylidene fluoride has parts corresponding to "spherical bodies" or "joining parts" of the present invention, the surface only has either of them, and the effect of the present invention cannot be obtained. For example, as for a filtration membrane made of polyvinylidene fluoride which only possesses a part corresponding to "joining parts" according to the present invention, even though the joining parts are connected uniformly, it is difficult to maintain enough strength to be used as a filtration membrane. To prevent this, if the parts corresponding to "joining parts" are made thicker, the parts become planar rather than linear and it is difficult to make minute pores. As an example, FIG. 2 is a scanning electron micrograph of a conventional filtration membrane made of polyvinylidene fluoride having such structure.

The spherical bodies of the skin layer of the microporous membrane according to the first embodiment of the present invention have an average particle diameter of 0.05 to 0.5 μm. Preferably, the average particle diameter is 0.1 to 0.4 μm, more preferably 0.2 to 0.3 μm. Many of the particle diameters of the spherical bodies have values close to the average particle diameter, resulting in uniform size. Furthermore, an average particle diameter differs among manufactured microporous membranes, and has the range in values as mentioned above. Therefore, various microporous membranes where pores formed in skin layer have a different pore size, and which are different in mean flow pore diameter can be obtained.

Figure 7:
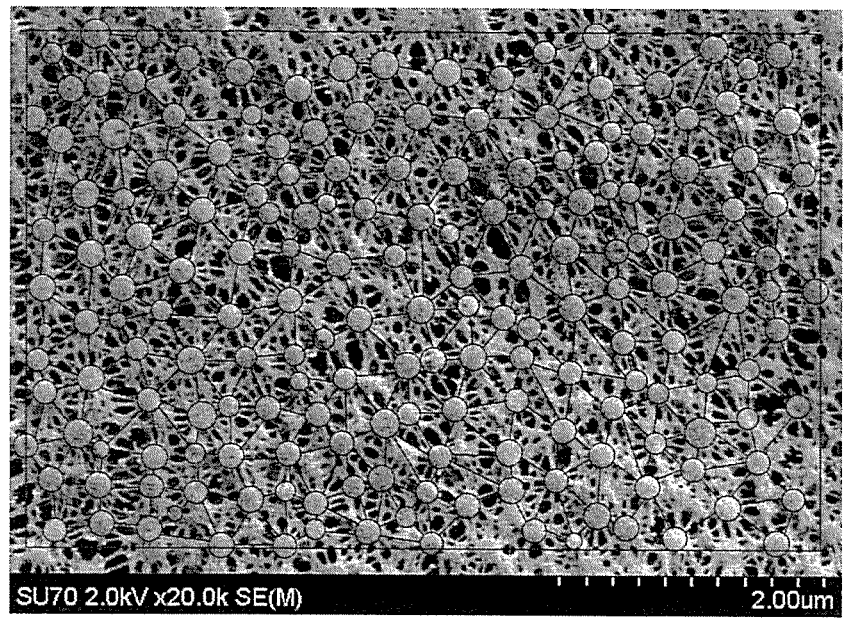
FIG. 7 is a photo of the skin layer surface of the microporous membrane of Example 1, and is used for the measurements of the particle diameters of the spherical bodies and the lengths of the linear joining parts.

The particle diameter of the spherical bodies can be determined by taking a photo by a scanning electron microscope (SEM) and the like at a magnification which can clearly identify the spherical bodies in the surface of the skin layer side of the microporous membrane, measuring the particle diameters of at least 50 of any spherical bodies, and averaging the diameters. Specifically, it is as described in Examples. Note that as shown in FIG. 7, "particle diameter" is a diameter of a perfect circle encircling the periphery of a spherical body with the maximum diameter without involving its surrounding pores. In order to have more uniform pore shape in the skin layer, each of the spherical bodies preferably has a nearly perfect globe and spherical bodies preferably have low variation in their sizes. Note that in the cases where a circle with the maximum diameter without involving its surrounding pores is an oval, the average of the major axis and the minor axis is the particle diameter of the spherical body.

In a frequency distribution, 45% or more of the particle diameters of the spherical bodies are within the ±10% range of the average particle diameter, and furthermore the frequency distribution of 50% or more is preferred. 55% or more is more preferred, and 60% or more is even more preferred. When 45% or more of the frequency is distributed within the ±10% range of the average particle diameter, the spherical bodies in the skin layer have more uniform shape and size, and can form void spaces of uniform pore diameter among the spherical bodies.

Preferably, the spherical bodies are dispersed homogeneously on the surface of the skin layer. For this reason, the frequency distribution of the distances from one spherical body to its most adjacent spherical body (center to center distance between the spherical bodies) preferably have the frequency distribution of 50% or more falling within the ±30% range of the average distance. 70% or more is more preferred, and 75% or more is even more preferred. When a frequency distribution of 50% or more is within the ±30% range of the average distance, the spherical bodies are dispersed more homogeneously on the surface of the skin layer, and can also form void spaces of uniform pore diameter among the spherical bodies in this case.

The skin layer of the microporous membrane according to the first embodiment of the present invention has an average length of linear joining parts being 0.05 to 0.5 µm. 0.1 to 0.4 µm is preferred, and 0.2 to 0.3 µm is more preferred. Many of the lengths of the linear joining parts have values close to the average length, resulting in uniform length. Furthermore, an average length differs among manufactured microporous membranes, and has the range in values as mentioned above. Therefore, various microporous membranes where pores formed in a skin layer have different pore sizes, and which are different in mean flow pore diameters can be obtained.

The average length of the linear joining parts can be determined by taking a photo by a scanning electron microscope (SEM) and the like at a magnification which can clearly identify the linear joining parts in the surface on the skin layer side of the microporous membrane, measuring lengths of at least 100 or more of any linear joining parts, and averaging the lengths. Specifically, it is as described in Examples. Note that as shown in FIG. 7, "length of linear joining part" is a distance between the perfect circles encircling the peripheries of spherical bodies with the maximum diameters without involving their surrounding pores. Note that when ovals are included, the length is a distance between circles (perfect circles or ovals).

In a frequency distribution, 35% or more of the lengths of linear joining parts are within the ±30% range of the average length, and furthermore a frequency distribution of 50% or more is preferred. 55% or more is more preferred, and 60% or more is even more preferred. When 35% or more of the frequency distribution is distributed within the ±30% range of the average length, the spherical bodies in the skin layer are dispersed more homogeneously, and void spaces of uniform pore diameters can be formed among the spherical bodies.

The ratio of the average particle diameter of spherical bodies to the average length of linear joining parts is preferably between 3:1 and 1:3. When the average particle diameter of spherical bodies is smaller than three times of the average length of linear joining parts, openings in the skin layer surface of the microporous membrane become bigger, and a high permeation amount is achieved more remarkably. On the other hand, when the average particle diameter of spherical bodies is bigger than one third of the average length of joining parts, the number of the joining parts which can be connected to one spherical body increases, and the feature of less falling-off of the filter material and high pressure resistance is achieved more remarkably.

The mean flow pore diameter of the microporous membrane according to the first embodiment of the present invention is 0.05 to 8 µm, preferably 0.05 to 0.5 µm, more preferably 0.07 to 0.25 µm and furthermore, 0.1 to 0.25 µm. This means that when the microporous membrane is used as a filtration membrane, depending on the size of mean flow pore diameter, a material having a diameter of approximately 0.05 to 8 µm or more can be separated. A mean flow pore diameter is a value based on the Bubble Point Method (ASTM F316-86).

The microporous membrane according to the first embodiment of the present invention has a pure water permeation flux of $1.5 \times 10^{-9}$ $m^3/m^2/Pa/s$ or more, preferably $30 \times 10^{-9}$ $m^3/m^2/Pa/s$ or more, more preferably $60 \times 10^{-9}$ $m^3/m^2/Pa/s$ or more. A pure water permeation flux of $1.5 \times 10^{-9}$ $m^3/m^2/Pa/s$ or more leads to sufficient water permeability of the membrane, and the problem of increase in running cost due to the need of higher filtration pressure or the like can be avoided in the case where sufficient water permeability cannot obtained. Note that as shown in Example 1, a pure water permeation flux is determined by letting water run through the microporous membrane under a certain filtration pressure, measuring an amount of flow per unit time and dividing the amount of flow by an effective filtration area and the filtration pressure.

Polymers as a material of the microporous membrane according to the first embodiment of the present invention are preferably a polyvinylidene fluoride-based resin (or the resin including it as the main component (containing 50 wt % or more)). Examples of polyvinylidene fluoride-based resin include resins containing homopolymers of vinylidene fluoride and/or copolymers of vinylidene fluoride. Homopolymers of vinylidene fluoride of a plurality of types differing in properties (viscosity, molecular weight or the like) may be contained. Or copolymers of vinylidene fluoride of a plurality of types may be contained. Examples of copolymer of vinylidene fluoride are not particularly limited if the polymers have vinylidene fluoride residue structure, are typically copolymers of a vinylidene fluoride monomer and a fluorine-based monomer other than the one aforementioned, and include, for example, a copolymer of at least one kind of fluorine-based monomers selected from vinyl fluoride, tetrafluoroethylene, hexafluoropropylene and trifluorochloroethylene chloride, and vinylidene fluoride. A homopolymer of vinylidene fluoride (polyvinylidene fluoride) is particularly preferred. Note that a polyvinylidene fluoride-based resin does not necessarily have to be pure, and other polymers may be mixed to impart other properties (for example, antibacterial properties) to the extent of not interfering with the effects of the present invention.

A polyvinylidene fluoride-based resin, being as a fluororesin, is mechanically, thermally and chemically stable. Other examples of representative fluororesin include so-called tetrafluoride-based resins such as polytetrafluoroethylene (PTFE), or copolymer resins having tetrafluoroethylene as the main component (such as tetrafluoroethlyeneperfluoroalkoxy ethylene copolymer). However, since a tetrafluoride-based resin has weak links between molecules, and therefore, has low mechanical strength, and when used for microporous membrane, pores are likely to be deformed due to filtration pressure. Furthermore, there is a disadvantage of the likelihood of further deformation when used at high temperature. Considering these points, a polyvinylidene fluoride-based resin is more excellent. Additionally, a polyvinylidene fluoride-based resin has an advantage in that it is easily processed and also fabricated after the processing (for example, cutting and adhesion with other materials) as compared to other fluororesins (for example, PTFE).

Figure 8:
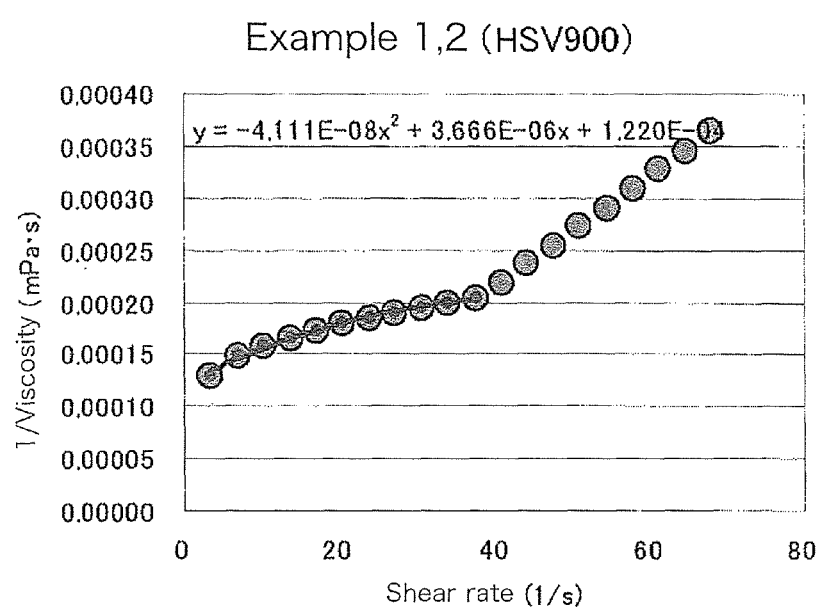
FIG. 8 is a graph showing the relationship between a reciprocal of the viscosity of the raw material solution and the shear rate of Examples 1 and 2.
Figure 9:
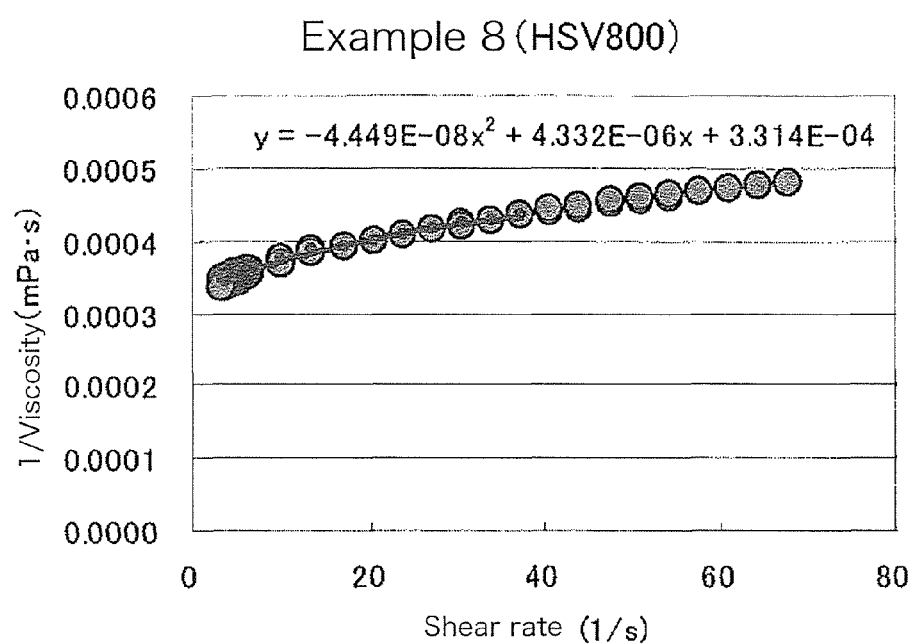
FIG. 9 is a graph showing the relationship between a reciprocal of the viscosity of the raw material solution and the shear rate of Example 8.
Figure 10:
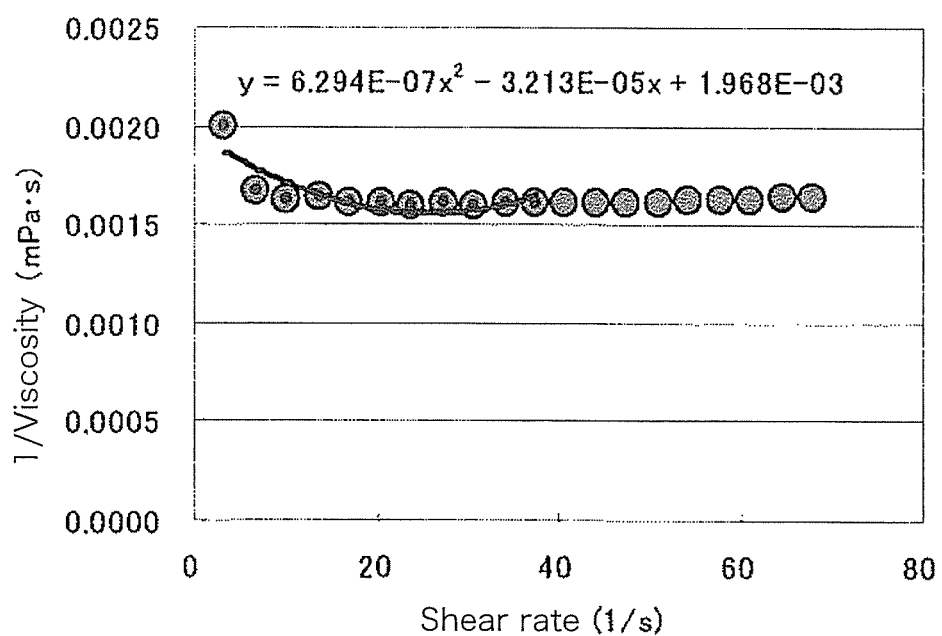
FIG. 10 is a graph showing the relationship between a reciprocal of the viscosity of the raw material solution and the shear rate of Comparative Example 2.
Figure 11:
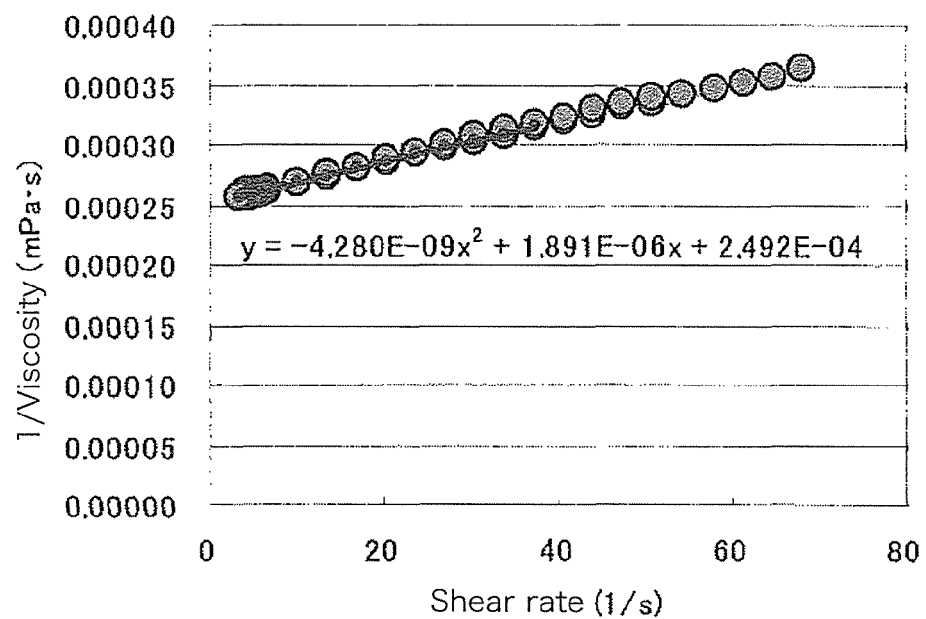
FIG. 11 is a graph showing the relationship between a reciprocal of the viscosity of the raw material solution and the shear rate of Comparative Example 3.
Figure 12:
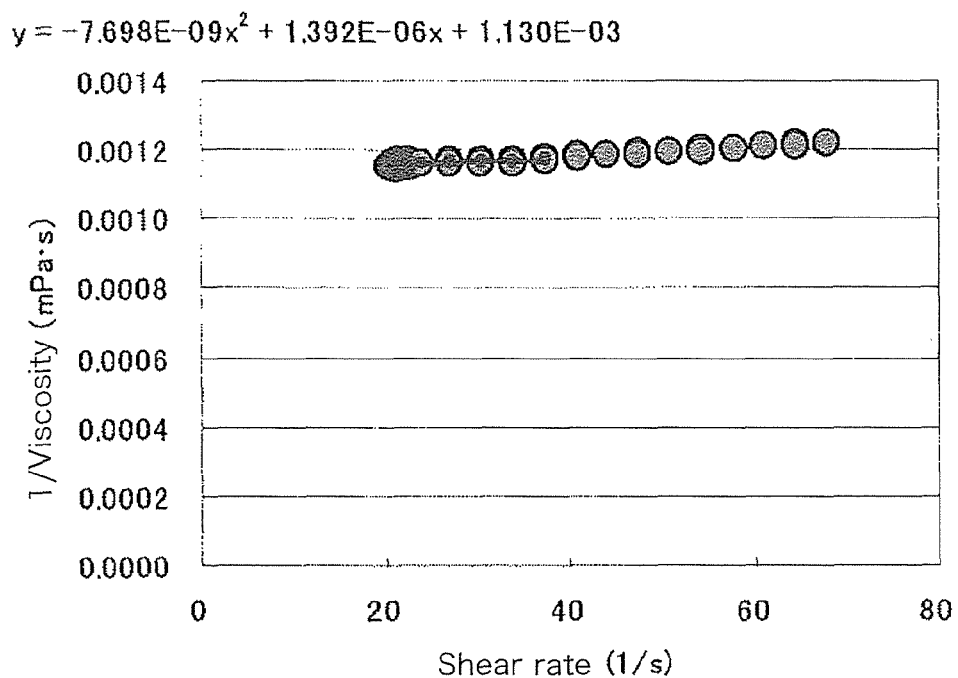
FIG. 12 is a graph showing the relationship between a reciprocal of the viscosity of the raw material solution and the shear rate of Comparative Example 4.
Figure 13:
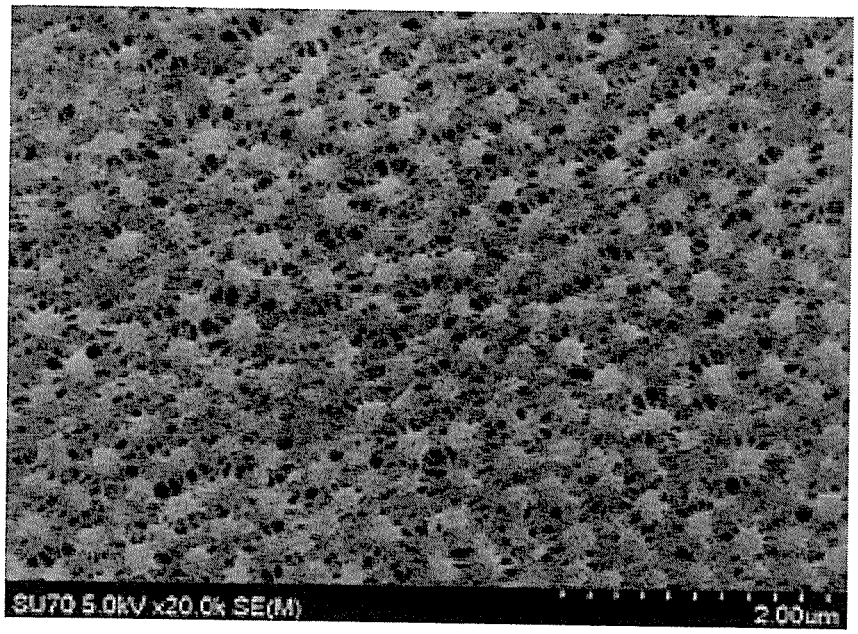
FIG. 13 is a photo of the skin layer surface of the microporous membrane of Example 1.
Figure 14:
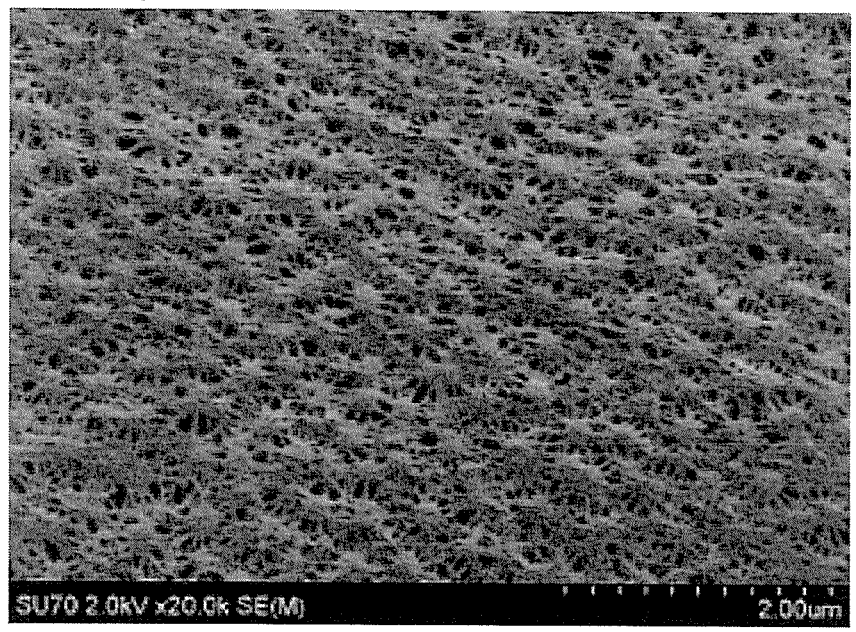
FIG. 14 is a photo of the skin layer surface of the microporous membrane of Example 2.
Figure 15:
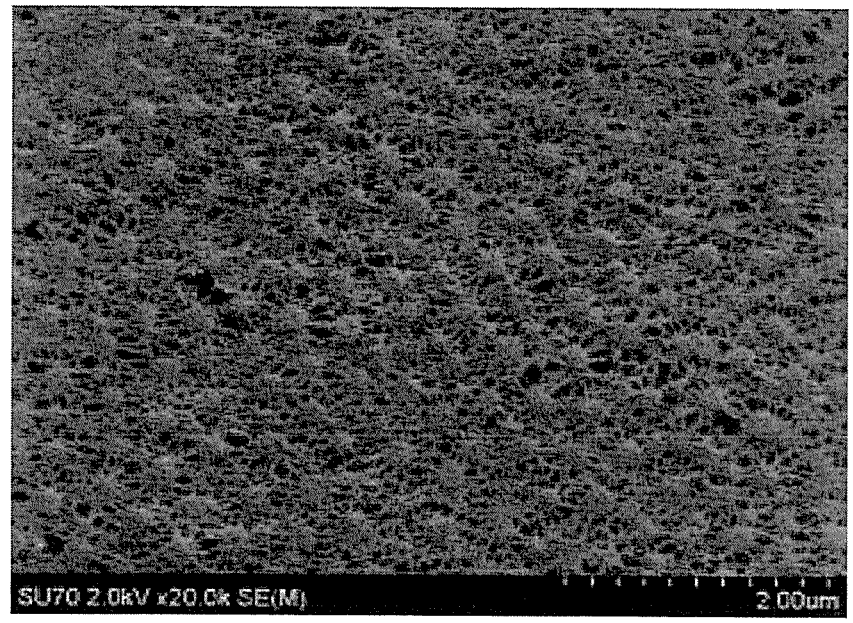
FIG. 15 is a photo of the skin layer surface of the microporous membrane of Example 3.
Figure 16:
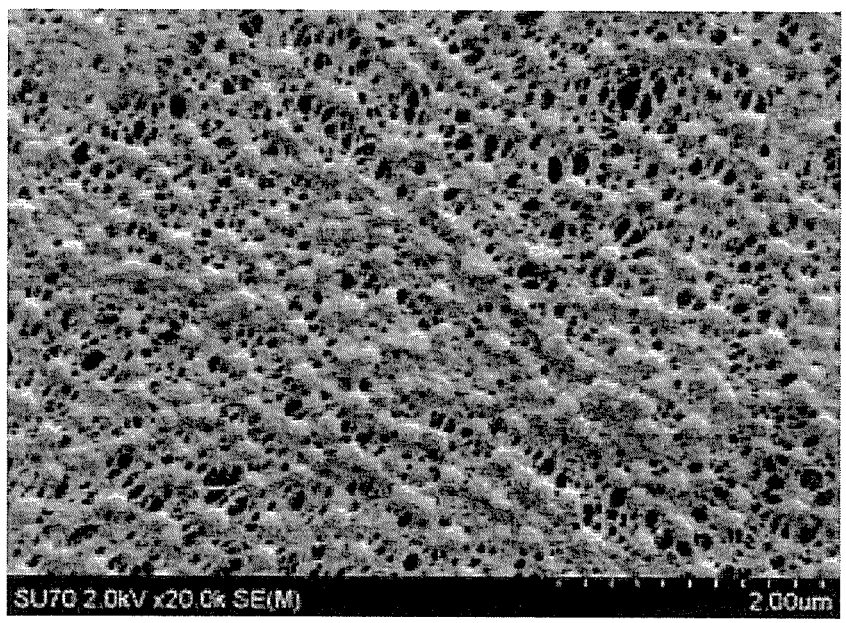
FIG. 16 is a photo of the skin layer surface of the microporous membrane of Example 4.
Figure 17:
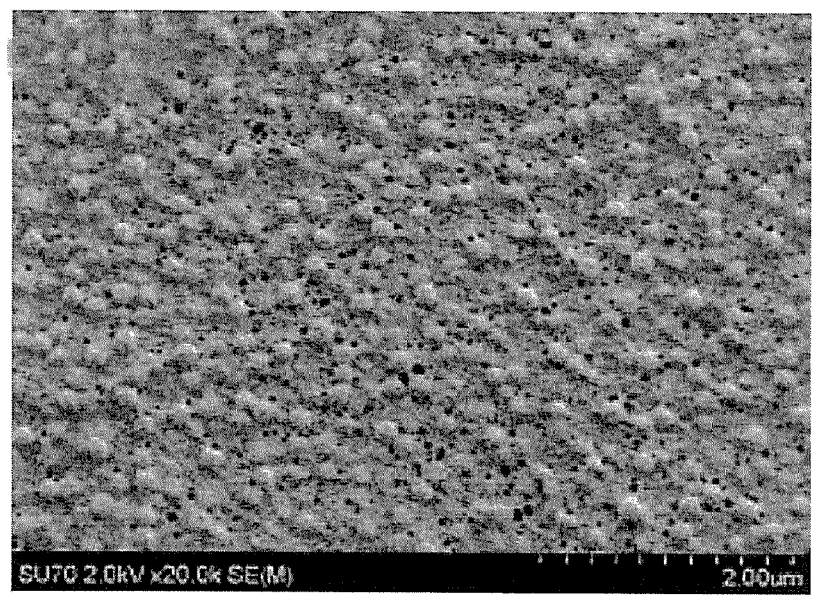
FIG. 17 is a photo of the skin layer surface of the microporous membrane of Example 5.
Figure 18:
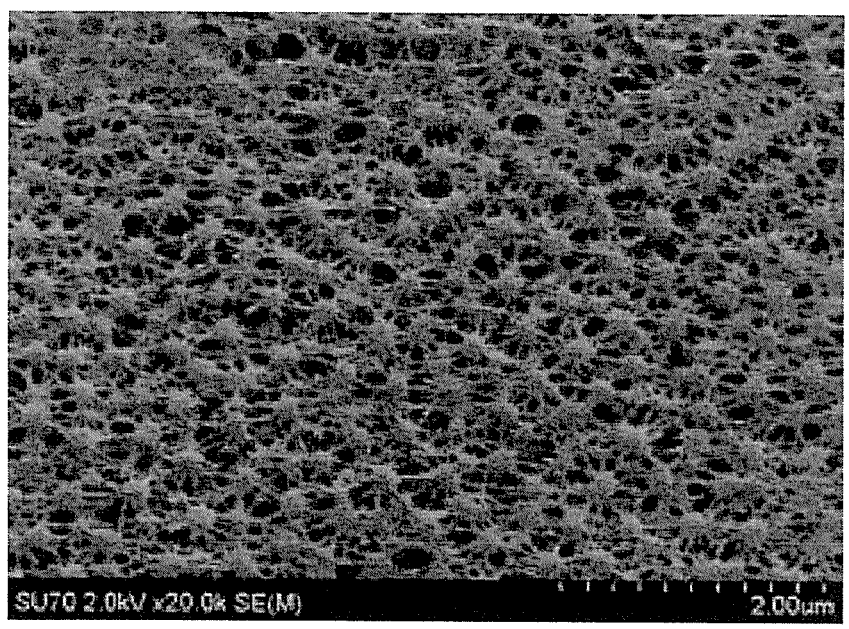
FIG. 18 is a photo of the skin layer surface of the microporous membrane of Example 6.
Figure 19:
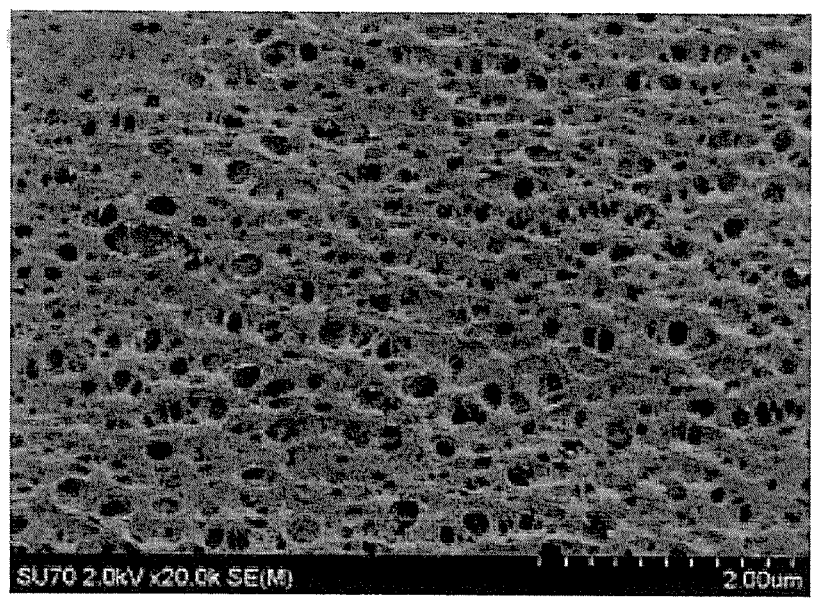
FIG. 19 is a photo of the skin layer surface of the microporous membrane of Example 7.
Figure 20:
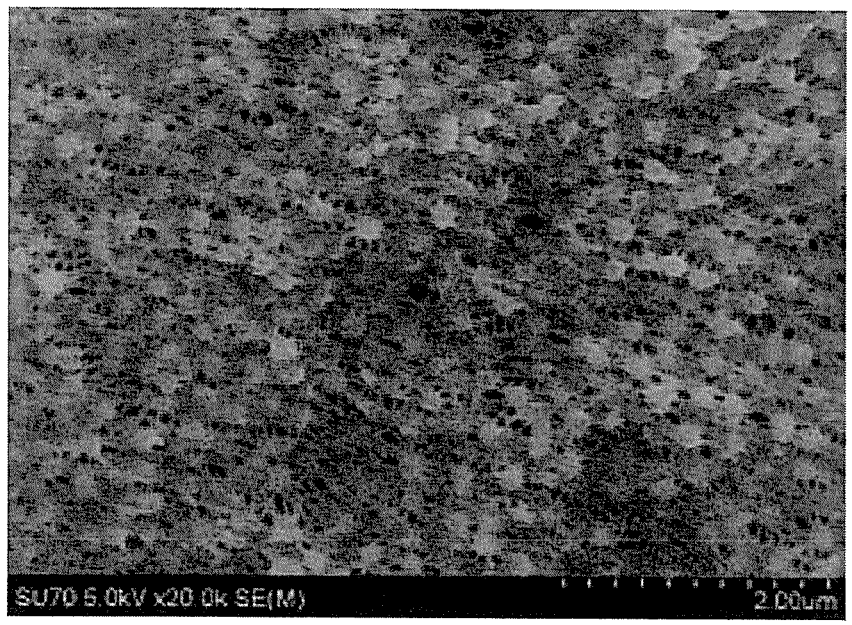
FIG. 20 is a photo of the skin layer surface of the microporous membrane of Example 8.
Figure 21:
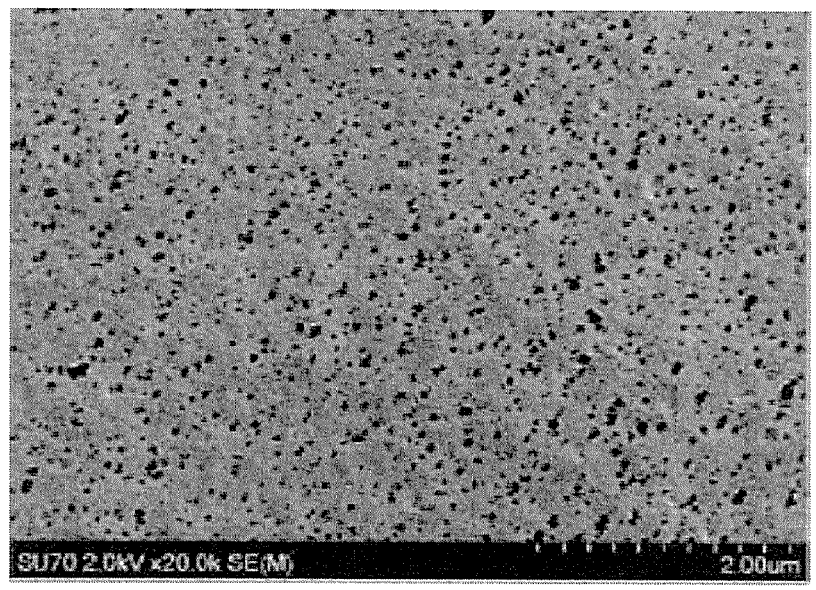
FIG. 21 is a photo of the skin layer surface of the microporous membrane of Comparative Example 1.
Figure 22:
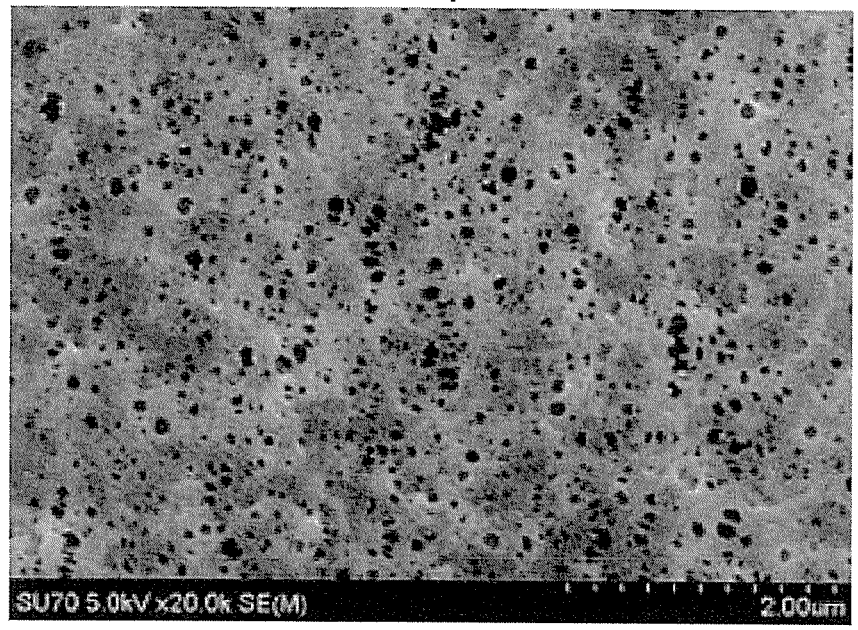
FIG. 22 is a photo of the skin layer surface of the microporous membrane of Comparative Example 2.
Figure 23:
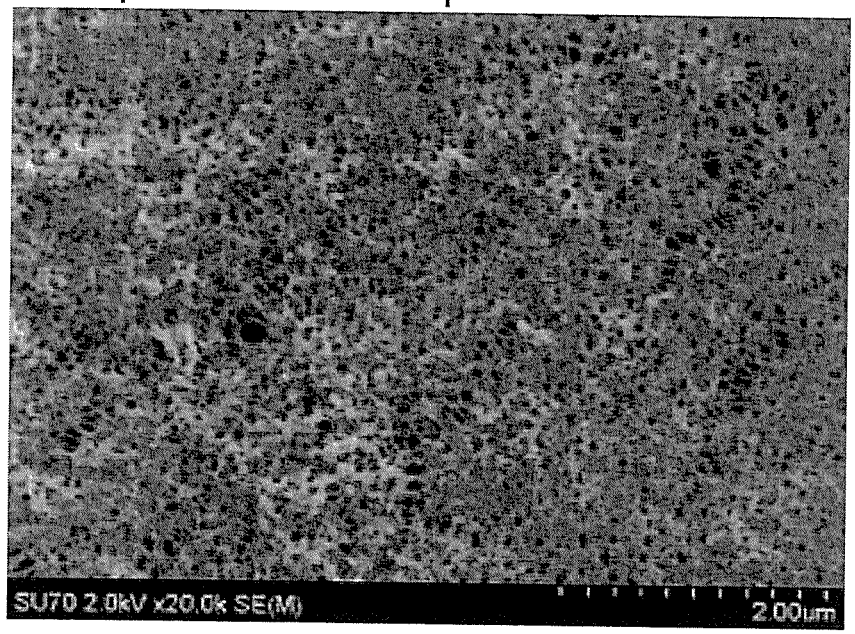
FIG. 23 is a photo of the skin layer surface of the microporous membrane of Comparative Example 3.
Figure 24:
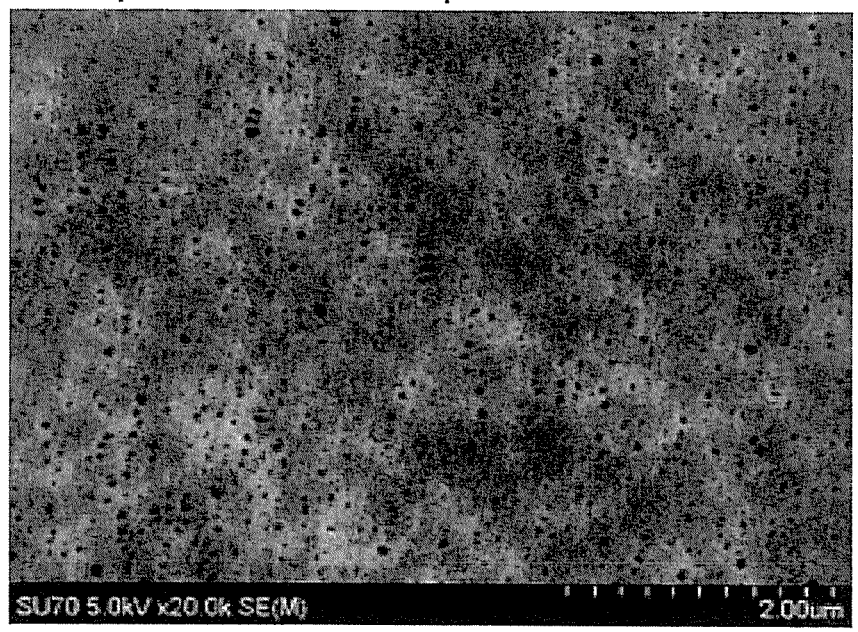
FIG. 24 is a photo of the skin layer surface of the microporous membrane of Comparative Example 4.

A particularly preferred resin among the aforementioned polyvinylidene fluoride-based resins is the one having the following characteristics. More specifically, as for a solution of the polyvinylidene fluoride-based resin dissolved in a good solvent, a part of graph with a reciprocal of the viscosity of the solution (unit cP) as the ordinate and the shear rate (unit 1/s) as the abscissa can be approximately correlated by a quadratic function, and as shown in FIG. 8, FIG. 9, the quadratic function is a curve having an arc of convex upward in the region of low shear rate (40/s or lower). This shows that there is a point where the viscosity of the solution increases drastically in the region of low shear rate.

For example, in a solution which comprises 10 parts by weight of polyvinylidene fluoride-based resin, 10 parts by weight of polyethyleneglycol and 80 parts by weight of dimethylacetamide, preferred is a polyvinylidene fluoride-based resin which has the characteristics that a part of graph with a reciprocal of the viscosity of the solution and the shear rate shows a secondary coefficient of the quadratic function being smaller than $10^{-8}$.

The skin layer of the present invention is induced by contacting the raw material solution with nonsolvent, and the nonsolvent being substituted for a solvent in the raw material solution. It is considered that when a polyvinylidene fluoride-based resin having the characteristics as described above is used, there is a rapid change in the viscosity of the raw material solution as the substitution proceeds, leading to a development of a three-dimensional network structure made of spherical bodies and linear joining parts. In fact, it is confirmed by Examples that the three-dimensional network structure of the present invention is developed by the raw material solution of the polyvinylidene fluoride-based resin having a secondary coefficient of $10^{-8}$ or smaller.

Additionally, the weight-average molecular weight of the polyvinylidene fluoride-based resin is 600,000 to 1,200,000, preferably 600,000 to 1,000,000, more preferably 700,000 to 950,000, even more preferably 790,000 to 900,000. The higher a weight-average molecular weight of a polyvinylidene fluoride-based resin, the easier it becomes to form spherical bodies and linear joining parts, and a microporous membrane with a skin layer having a three-dimensional network structure can be easily obtained. Therefore, this allows a wider selection of good solvents and poor solvents which are described later and facilitates improving permeability and membrane strength of the microporous membrane. A non-excessively high weight-average molecular weight is preferred to be able to control the viscosity of the raw material solution, and to facilitate uniform application which helps to have a coexisting portion of support layer and substrate layer.

Note that polyvinylidenefluoride having a weight-average molecular weight out of this range may be mixed to improve adhesion with other materials and membrane strength to the extent of not interfering with the effects of the present invention.

"Good solvent" herein is defined as a liquid which can dissolve a required amount of polyvinylidene fluoride-based resin under the temperature condition necessary for the application of a raw material solution. Furthermore, "nonsolvent" is defined as a solvent which does not dissolve or lubricate a polyvinylidene fluoride-based resin under the temperature condition necessary for substituting a nonsolvent for a good solvent during the membrane formation. Moreover, "poor solvent" is defined as a solvent which cannot dissolve a required amount of polyvinylidene fluoride-based resin, but can dissolve an amount less than the required amount or lubricate the resin.

Examples of good solvents include lower alkyl ketones, alkyl esters, alkyl amides and the like, such as N-methyl-2-pyrrolidone (NMP), dimethyl sulfoxide, N,N-dimethylacetamide (DMAc), N,N-dimethylformamide (DMF), methyl ethyl ketone, acetone, tetrahydrofuran, tetramethylurea, trimethyl phosphate and the like. These good solvents can be used in combination and may include a poor solvent and a nonsolvent to the extent of not interfering with the effects of the present invention. When the membrane formation is carried out at ordinary temperature, N-methyl-2-pyrrolidone, N,N-dimethylacetamide and N,N-dimethylformamide are preferred.

Examples of nonsolvents include aliphatic hydrocarbons, aromatic hydrocarbons, chlorinated hydrocarbons, other chlorinated organic liquids and the like, such as water, hexane, pentane, benzene, toluene, methanol, ethanol, carbon tetrachloride, o-dichlorobenzene, trichloroethylene, polyethylene glycol of low molecular weight and the like. A nonsolvent needs to be dissolved in a good solvent, and a nonsolvent mixed with a good solvent at a free ratio is preferred. A good solvent or a poor solvent may be added intentionally to a nonsolvent.

Since the substitution speed of a good solvent and a nonsolvent affects a development of the three-dimensional network structure of the present invention, the combination is also important. As for the combination, in terms of ease of the development of the three-dimensional network structure, NMP/water, DMAc/water, DMF/water and the like are preferred, and the combination of DMAc/water is particularly preferred.

Besides a polyvinylidene fluoride-based resin as a material and its good solvent, a porosity forming agent to facilitate multipore formation may be added to a raw material solution for the membrane formation. A porosity forming agent is not limited as long as it has the property of not interfering with the polyvinylidene fluoride-based resin to dissolve in a good solvent, and dissolving in a nonsolvent and facilitating multipore formation in a microporous membrane. The examples thereof are high molecular organic substances, low molecular organic substances and the like, and specifically can include water-soluble polymers such as polyethylene glycol, polypropylene glycol, polyvinyl alcohol, polyvinyl acetate, polyvinylpyrrolidone and polyacrylic acid; esters of polyhydric alcohols such as sorbitan fatty acid ester (monoesters, triesters and the like); ethylene oxide low molar adducts such as ethylene oxide low molar adduct of sorbitan fatty acid ester, ethylene oxide low molar adduct of nonylphenol, pluronic-type ethylene oxide low molar adduct; surfactants such as polyoxyethylene alkyl ester, alkylamine salt, and polyacrylic acid soda; polyhydric alcohols such as glycerin; and glycols such as tetraethylene glycol and triethylene glycol. One kind or a mixture of more than two kinds of the above substances may be used. These porosity forming agents preferably have a weight-average molecular weight of 50,000 or lower, more preferably 30,000 or lower, even more preferably 10,000 or lower. The porosity forming agents having a molecular weight higher than the aforementioned values are unlikely to be dissolved homogeneously in a polyvinylidene fluoride-based resin solution, and therefore, may not be preferred. When a good solvent is extracted in a nonsolvent and structural coagulation occurs, this porosity forming agent remains in a porous resin for relatively extended periods of time compared to a good solvent. Therefore, the porosity forming agent has a large influence on the membrane structure. As for a porosity forming agent when water is used as a nonsolvent, water soluble liquid having a moderate viscosity is preferred in terms of ease of performing these functions and developing a three-dimensional network structure made of spherical bodies and linear joining parts. Polyethylene glycol and polyvinylpyrrolidone are more preferred, and particularly polyethylene glycol is preferred. Polyethylene glycol having a weight-average molecular weight of 200 to 1,000 is further preferred. The weight-average molecular weight of 200 to 1,000 especially helps develop the structure easily. Furthermore, the weight-average molecular weight of 1,000 or less makes it easy to remove the porosity forming agent after the development of the structure.

When a porosity forming agent is used, the porosity forming agent is extracted after the structural coagulation slows down along with the extraction of a good solvent, and the resulting porous resin has a high porosity. The resulting structure depends on the type, molecular weight, added amount and the like of the porosity forming agent. When an added amount of the porosity forming agent is small, it is difficult to obtain such an effect. However, when an added amount is large, macrovoids produced in the support layer become big, and the membrane strength may decrease. Thus a porosity forming agent having a 0.1 to 2 times of the amount with respect to the weight of the polyvinylidene fluoride-based resin is preferably added, and a 0.5 to 1.5 times of the amount is further preferred.

Figure 3:
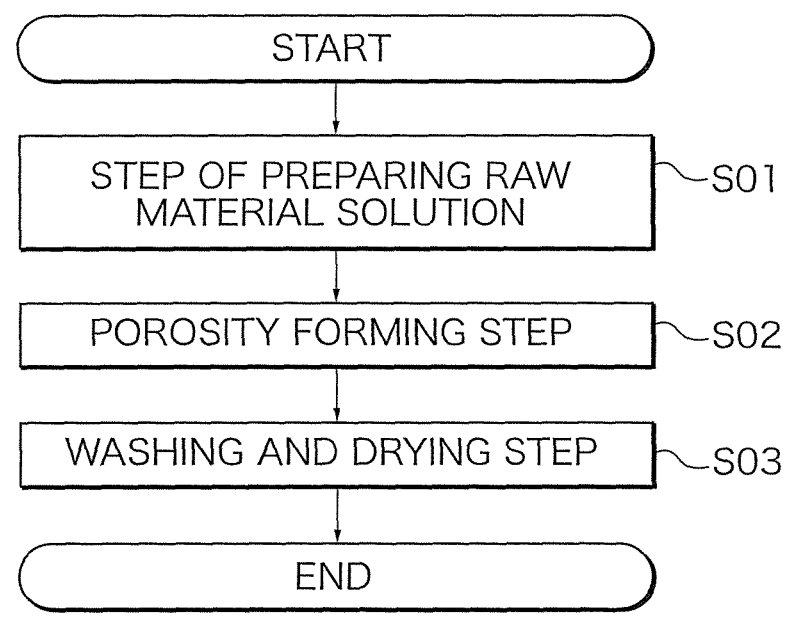
FIG. 3 is a flowchart showing the method of manufacturing the microporous membrane of a second embodiment.

A method of manufacturing a microporous membrane according to a second embodiment of the present invention is as follows. Note that FIG. 3 shows a general flow of the manufacturing method.

(1) Step of Preparing Raw Material Solution (S01):

First, a raw material solution is prepared by dissolving a polymer as a material of the microporous membrane in a solvent which is a good solvent for the polymer. Specifically, for example, a raw material solution is prepared by dissolving 5 to 20 parts by weight of polyvinylidene fluoride as a material and a 0.1 to 2 times of the amount of polyethylene glycol as a porosity forming agent with respect to the material weight in 70 to 90 parts by weight of dimethylacetamide (DMAc) at ordinary temperature to 100° C., and returning to ordinary temperature.

(2) Porosity Forming Step (S02):

Next, the raw material solution is applied to a nonwoven fabric as the substrate layer which is placed on a flat coating bench such as glass plate or stainless plate. The raw material solution may be applied directly to a glass plate or the like as support without placing a nonwoven fabric or the like, and in this case, a microporous membrane is formed without a substrate layer. Additionally, it is also preferred to apply to have a thickness of approximately 10 to 500 μm after the membrane formation. Immediately after the application or after allowing to be stood for a given period of time after the application, the above material is immersed in a nonsolvent for the material polymer of raw material for 3 minutes to 12 hours. When the material is allowed to stand for a given period of time after the application, 5 to 60 seconds are preferred. When the material is allowed to stand for a long time, mean flow pore diameter becomes larger. However, when the material is allowed to stand too long, pinholes are generated and the effect of the present invention may not be obtained satisfactorily. The good solvent and the nonsolvent are mixed, and the introduction of the nonsolvent lowers the solubility of the polymer in the good solvent, resulting in the deposition of the polymer and the porosity formation (nonsolvent-induced phase separation (NIPS)).

Specifically, for example, the raw material solution is applied to a polyester nonwoven fabric placed on glass plate. A baker applicator, a bar coater, a T-die or the like may be used for the application. After immersing the above material in the nonsolvent, the glass plate used as coating bench (support) is removed to obtain a microporous membrane.

(3) Washing and Drying Step (S03):

At last, the resulting microporous membrane is washed in water exchanged for the fresh one several times. Generally, since DMAc is less likely to evaporate than water, incomplete washing leads to accumulation of the solvent (DMAc), and established pore structure may be dissolved again. Thus, a plurality of washing is preferred. To reduce a displacement and to speed up a washing speed, hot water or an ultrasonic washing machine may be used for washing. After washing, the microporous membrane may also be dried. As for drying, air drying, drying by a hot-air dryer or a far-infrared dryer to speed up a drying speed may be used, or a pin stenter type dryer to prevent shrinkage and waviness of the microporous membrane due to drying may be used.

According to the porosity forming step (S02), a substrate layer may be provided at the membrane formation. When the substrate layer is provided, shrinkage of the polymer during immersion is inhibited and a skin layer having sufficient void spaces can be obtained, when compared to the case where a substrate layer is not provided. Furthermore, the substrate layer may prevent the raw material solution from carelessly running out during the application of the raw material solution. The substrate layer is effective especially for a raw material solution with low viscosity. Additionally, a substrate layer functions as a reinforcing material, so that a membrane can further tolerate filtration pressure. As for the substrate layer, paper, a nonwoven fabric obtained by the spunbond method or the melt blown method, a woven fabric, a porous plate or the like may be used, and as for its material, polyester, polyolefin, ceramic, cellulose or the like may be used. Particularly, a spunbond nonwoven fabric made of polyester is preferred due to its excellent balance in softness, lightweight property, strength and heat resistance. Note that when a nonwoven fabric is used, the fabric weight thereof is preferably in the range between 15 and 150 $g/m^2$, more preferably in the range between 30 and 70 $g/m^2$. When the fabric weight exceeds 15 $g/m^2$, the effect of the substrate layer can be satisfactorily obtained. On the other hand, the fabric weight falls below 150 $g/m^2$, a postprocessing such as folding and thermal bonding can be easily performed.

As mentioned above, the microporous membrane of the present invention has uniform pore size and pore diameter in the skin layer due the three-dimensional network structure made of homogenous the spherical bodies and the linear joining parts in the skin layer, and can achieve high permeability (for example, high water permeability, high liquid permeability). This means that due to more uniform size and shape of the pores, the membrane has a narrow pore size distribution and can achieve unprecedented permeability, while maintaining the particle rejection rate. Furthermore, a polyvinylidene fluoride-based resin is used as a membrane material, the membrane can have excellent chemical resistance and high heat-resistant temperature (to 120° C.). Note that the microporous membrane of the present invention may be a flat membrane or a follow fiber membrane. When the microporous membrane of the present invention is a flat membrane, it has an advantage that it is easy to surface-clean the clogging of the membrane over common flat membranes. On the other hand, when the microporous membrane of the present invention is a follow fiber membrane, it has an advantage of showing more effect of backwashing over common follow fiber membranes.

The microporous membrane of the present invention can also be used for retaining material of drug solution used for adhesive plasters and the like, surface material of sanitary supplies, battery separators, PVDF sheets of large surface area without components falling off, and the like besides filtration membranes.

EXAMPLES

In the following, the invention will be explained in detail by way of Examples, but the invention is in no way limited to the Examples.

[[Used Materials and the Like]]

A first grade reagent of polyethylene glycol 600 (weight-average molecular weight 600) manufactured by Wako Pure Chemical Industries, Ltd., a guaranteed reagent of polyvinylpyrrolidone (weight-average molecular weight 40,000) manufactured by Wako Pure Chemical Industries, Ltd., a guaranteed reagent of dimethylacetamide manufactured by Wako Pure Chemical Industries, Ltd., and a guaranteed reagent of N-methyl-2-pyrrolidone manufactured by Wako Pure Chemical Industries, Ltd. are used as they are.

As for polyvinylidene fluoride, polyvinylidene fluoride manufactured by ARKEMA K.K. including "Kynar HSV900" (weight-average molecular weight 800,000, number-average molecular weight 540,000), "Kynar HSV800" (weight-average molecular weight 800,000, number-average molecular weight 440,000), "Kynar HSV500" (weight-average molecular weight 890,000, number-average molecular weight 360,000), "Kynar 741" (weight-average molecular weight 490,000, number-average molecular weight 240,000), and "Kynar 761A" (weight-average molecular weight 780,000, number-average molecular weight 380,000) and polyvinylidene fluoride of "W#7200" (weight-average molecular weight 1,120,000, number-average molecular weight 510,000) manufactured by Kureha Corporation are used.

As for polyester nonwoven fabric as a substrate layer, a spunbond nonwoven fabric (fabric weight 50 g/m$^2$) manufactured by Unitika Ltd. or H1007 (fabric weight 70 g/m$^2$) manufactured by Japan Vilene Company, Ltd., is used.

As for glass plate, the size of 20 cm×20 cm is used.

As for water, ultrapure water having a specific resistance value of 18MΩ·cm or more of "DirectQ UV" (trade name) manufactured by Merck Millipore is used.

[[Evaluation Methods]]

Physical property values of the microporous membranes obtained from Examples and Comparative Examples are measured by the following methods.

1) Average Molecular Weight of Polymer

The number-average molecular weight and the weight-average molecular weight are determined by dissolving the polymer in dimethylformamide (DMF), using Shodex Asahipak KF-805L as a column and DMF as a developing agent, measuring by the gel permeation chromatography (GPC) method and polystyrene-converting.

2) Thickness of Skin Layer and Thickness of Support Layer

Figure 6A:
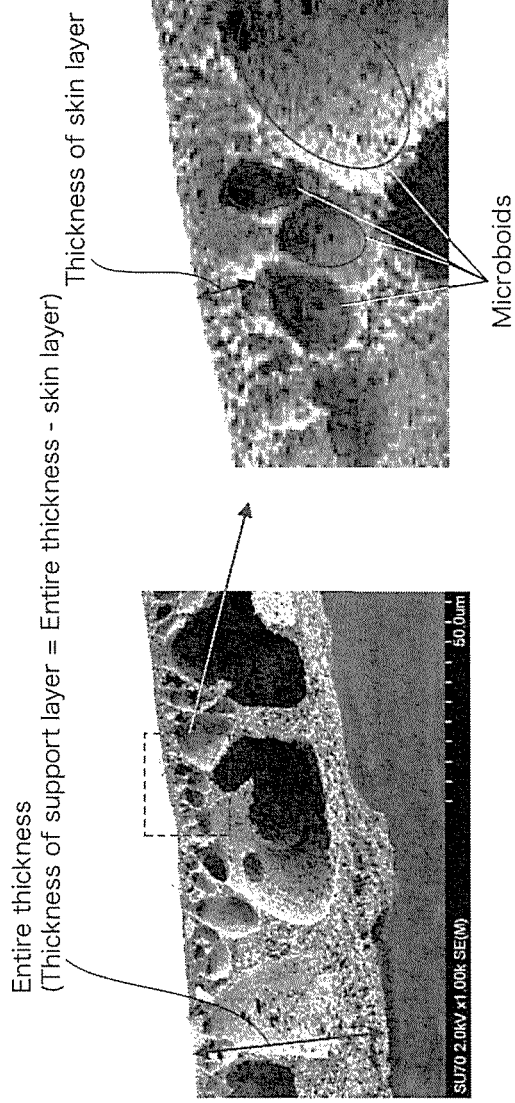
FIG. 6A is a cross-sectional photo of the microporous membrane of Example 1.
Figure 6B:
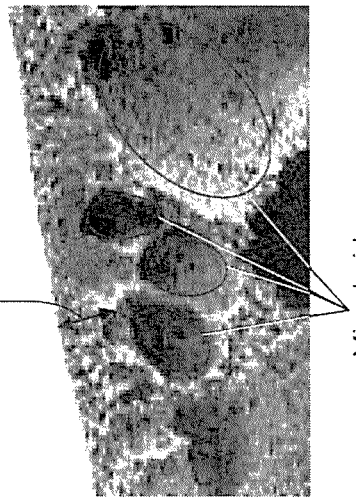
FIG. 6B is an enlarged photo of the cross-sectional portion of the skin layer.

As shown in FIG. 6, a cross-sectional photo of the resulting microporous membrane is taken by a scanning electron microscope (SEM) and image-analyzed to define "thickness of skin layer" as a distance from the surface to the zone where macrovoids appear, and "thickness of support layer" as a value resulting from subtracting the thickness of skin layer from the thickness of the entire microporous membrane.

3) Mean Flow Pore Diameter

A mean flow pore diameter is determined according to ASTM F316-86 by using "Capillary Flow Porometer CFP-1200AEX" manufactured by PMI.

4) Flux

The resulting microporous membrane is cut into a circle having 25 mm diameter. The cut membrane is placed on a filter sheet holder having effective filtration area of 3.5 cm$^2$. By applying 50 kPa filtration pressure and letting 5 mL of ultrapure water run through the membrane, the time required for the completion of water run is measured.

Flux is determined by the following formula (1).

$$\text{Flux}(10^{-9}\ m^3/m^2/Pa/sec) = \text{amount of water run } (m^3) \div \text{effective filtration area } (m^2) \div \text{filtration pressure } (Pa) \div \text{time } (sec) \qquad (1)$$

5) Number of Spherical Bodies, Average Particle Diameter and Frequency Distributions A photo of a skin layer surface of microporous membrane is taken by a scanning electron microscope with a magnifying power of 20,000. As shown in FIG. 7, as for spherical bodies having its center located in the region of 4 μm (vertical length)×6 μm (horizontal length) in the center of photo, a periphery of a spherical body is encircled by a perfect circle or an oval with the maximum diameter without involving its surrounding pores. The diameter of the perfect circle or the oval (in the case of oval, the average of the major axis and the minor axis is the particle diameter) is a particle diameter of the spherical body. Note that when the number of linear joining parts connected to a body is three or less, the body is not considered as a spherical body due to difficulty in distinguishing from linear joining parts. The average value of the diameters of all the spherical bodies present in the region is an average particle diameter. A frequency distribution is determined by counting the number of the particles whose diameters are within the ±10% range of the average particle diameter among all the spherical bodies, and dividing this number by the total number of the particles.

6) Center to Center Distances Between Spherical Bodies, Average Distance and Frequency Distribution For the circles drawn in 5), a center to center distance between one circle and another one most adjacent to the aforementioned circle is determined respectively. The average value of all the center to center distances is an average distance. Furthermore, a frequency distribution is determined by counting the number of center to center distances which are within the ±30% range of the average distance among all the center to center distances, and dividing this number by the total number of center to center distances.

7) Number of Joining Parts, Average Length and Frequency Distribution

As shown in FIG. 7, the number and length of all the joining parts between the spherical bodies (wherein when two spherical bodies are connected by a plurality of joining parts, one of them is used) included in the region are measured to determine the number of all the joining parts and an average length. A frequency distribution is determined by counting the number of joining parts whose lengths are within the ±30% range of the average distance among all the joining parts, and dividing this number by the total number of the joining parts.

8) Quadratic Coefficient

Solution viscosities at 25° C. while changing shear rate are measured using a B-type rotational viscometer DV-II+ Pro manufactured by Brookfield. Then, a quadratic coefficient (a, unit $(1/s)^{-2}$) is determined when shear rates (unit 1/s) with respect to reciprocals of solution viscosities (unit cP) are correlated by a quadratic function ($Y=aX^2+bX+c$).

Example 1

Step of Preparing Raw Material Solution 10 parts by weight of polyvinylidene fluoride "Kynar HSV900" (weight-average molecular weight 800,000) and 10 parts by weight of polyethylene glycol were mixed to 80 parts by weight of dimethylacetamide, and were dissolved at 90° C. The solution was returned to ordinary temperature to be a raw material solution.

[Porosity Forming Step]

A spunbond nonwoven fabric manufactured by Unitika Ltd. as a substrate layer was placed on a glass plate, and the raw material solution was applied thereon by a baker applicator at thickness of 250 μm. Immediately after the application, the material above was placed in ultrapure water to form multipores in the membrane. The membrane was washed in ultrapure water exchanged for the fresh one several times, taken out from water, and dried to be a microporous membrane.

Example 2

A microporous membrane was obtained by the same method as Example 1 except that H1007 manufactured by Japan Vilene Company, Ltd., was used for a substrate layer.

Example 3

A microporous membrane was obtained by the same method as Example 2 except that N-methyl-2-pyrrolidone instead of dimethylacetamide was used.

Example 4

A microporous membrane was obtained by the same method as Example 2 except that polyvinylpyrrolidone (weight-average molecular weight 40,000) was used instead of polyethylene glycol.

Example 5

A microporous membrane was obtained by the same method as Example 4 except that N-methyl-2-pyrrolidone was used instead of dimethylacetamide.

Example 6

10 parts by weight of "Kynar HSV900" was mixed to 90 parts by weight of N-methyl-2-pyrrolidone, and were dissolved at 90° C. A microporous membrane was obtained by the same method as Example 2 except that the solution above was returned to ordinary temperature to be a raw material solution.

Example 7

A microporous membrane was obtained by the same method as Example 6 except that dimethylacetamide was used instead of N-methyl-2-pyrrolidone.

Example 8

A microporous membrane was obtained by the same method as Example 2 except that "Kynar HSV800" (weight-average molecular weight 800,000) was used for polyvinylidene fluoride.

Comparative Example 1

A microporous membrane was obtained by the same method as Example 2 except that "Kynar HSV741" (weight-average molecular weight 490,000) was used for polyvinylidene fluoride.

Comparative Example 2

A microporous membrane was obtained by the same method as Example 2 except that "Kynar HSV761A" (weight-average molecular weight 780,000) was used for polyvinylidene fluoride.

Comparative Example 3

A microporous membrane was obtained by the same method as Example 2 except that "W#7200" (weight-average molecular weight 1,120,000) was used for polyvinylidene fluoride.

Comparative Example 4

A microporous membrane was obtained by the same method as Example 2 except that "Kynar HSV500" (weight-average molecular weight 880,000) was used for polyvinylidene fluoride.

Figure 4:
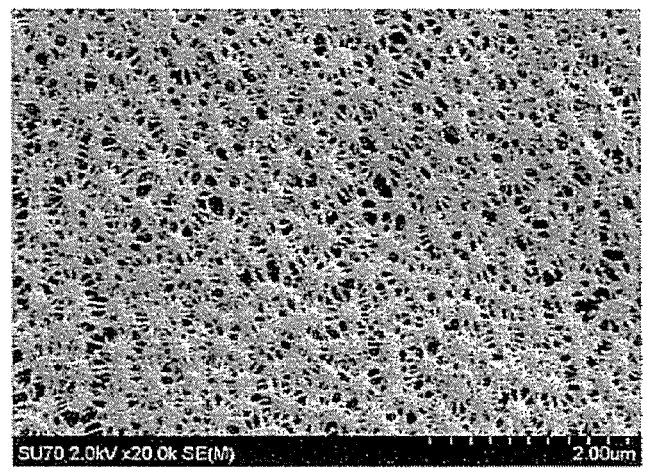
FIG. 4 is a photo of the skin layer surface of the microporous membrane of Example 1.
Figure 5:
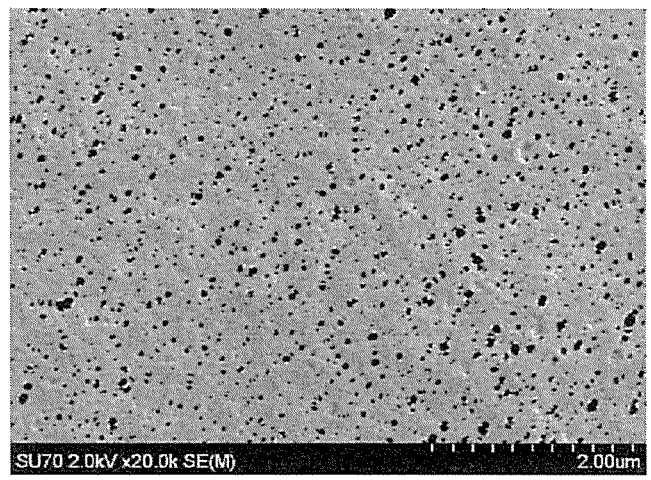
FIG. 5 is a photo of the skin layer surface of the microporous membrane of Comparative Example 1.

As is clear from the comparison between FIG. 4 and FIG. 5, the skin layer of the microporous membrane of Example 1 constructs a three-dimensional network structure made of spherical bodies and linear joining parts. However, the skin layer of the microporous membrane of Comparative Example 1 is not composed of spherical bodies and linear joining parts, and does not have a three-dimensional network structure.

As shown in Table 1, even though Example 1 has slightly smaller mean flow pore diameter than Comparative Example 1, Example 1 has rather extremely high flux.

Furthermore, when comparing flow rates between Examples and Comparative Examples having similar mean flow pore diameter (for example, Example 1 and Comparative Example 2, Example 2 and Comparative Example 3, Example 3 and Comparative Example 4, Example 8 and Comparative Example 1, and the like), the microporous membranes of Examples have extremely higher flow rates than the ones of Comparative Examples.

TABLE 1

| | Mean flow pore diameter (μm) | Flux ($10^{-9}$ m³/m²/Pa/sec) | Quadratic coefficient | Three-dimensional network structure having spherical bodies |
|---|---|---|---|---|
| Example 1 | 0.16 | 130 | $-4.11 \times 10^{-8}$ | ○ |
| Example 2 | 0.10 | 60 | $-4.11 \times 10^{-8}$ | ○ |
| Example 3 | 0.14 | 208 | $-3.28 \times 10^{-7}$ | ○ |
| Example 4 | 2.66 | 335 | $-3.91 \times 10^{-8}$ | ○ |
| Example 5 | 7.43 | 476 | $-1.23 \times 10^{-8}$ | ○ |
| Example 6 | 0.11 | 59 | $-5.587 \times 10^{-8}$ | ○ |
| Example 7 | 0.12 | 1.8 | $-9.785 \times 10^{-8}$ | ○ |
| Example 8 | 0.20 | 143 | $-4.45 \times 10^{-8}$ | ○ |
| Comparative Example 1 | 0.19 | 70 | Unable to measure | x |
| Comparative Example 2 | 0.16 | 65 | $6.29 \times 10^{-7}$ | x |
| Comparative Example 3 | 0.10 | 35 | $-4.28 \times 10^{-9}$ | x |
| Comparative Example 4 | 0.15 | 59 | $-7.70 \times 10^{-9}$ | x |

As for the raw material solutions of Examples 1, 2 and 8, and Comparative Examples 2, 3 and 4, FIG. 8 to FIG. 12 show graphs that reciprocals of solution viscosities (unit cP) and shear rates (unit 1/s) are correlated by a quadratic function. The raw material solution of Examples 1, 2 and 8 in which a three-dimensional network structure was developed drawing a curve having a clear arc of convex upward in the region of low shear rates. This means that the characteristics of drastic increase in viscosity were exhibited in the region of shear rate 40/s or lower. Specifically, three-dimensional network structure of the present invention was developed in a membrane made of a raw material solution having a value of quadratic coefficient a smaller than $10^{-8}$. On the other hand, for the raw material solutions of Comparative Examples 2, 3 and 4 where a three-dimensional network structure was not developed, the quadratic coefficient a was a value well above $10^{-8}$.

Note that the raw material solutions of Examples 1, 2 and 8, and Comparative Examples 2, 3 and 4 all have 10 parts by weight of polyvinylidene fluoride, 80 parts by weight of dimethylacetamide and 10 parts by weight of polyethylene glycol. Thus, comparison with Example 1 and the like is not possible, however, the Example 3 shows a quadratic coefficient of $-3.28 \times 10^{-7}$, and it is easily predicted that a curve having a clear arc of convex upward is drawn, or there is a point of drastic increase in viscosity in the region of shear rate 40/s or lower. In fact, in the membrane made of the raw material solution of Example 3, the three-dimensional network structure of the present invention was developed. The same applies to Example 4 to 7.

"○" in Table 1 indicates that a three-dimensional network structure having spherical bodies was developed. "x" indicates that a three-dimensional network structure having spherical bodies was not developed.

FIG. 13 to FIG. 24 show photos of the skin layer surfaces in the microporous membranes of Examples 1 to 8 and Comparative Examples 1 to 4 for reference. It is clear that in the microporous membranes of Examples 1 to 8, spherical bodies adjacent to each other are connected by linear joining parts to form a three-dimensional network structure where spherical bodies serve as intersections. On the other hand, in the microporous membranes of Comparative Examples 1 to 4, spherical bodies were not formed, or spherical bodies were not clearly distinguished from linear joining parts.

As an example of analysis, Table 2 and 3 show the particle diameters of the spherical bodies 1 (diameters of perfect circles) determined by the scanning electron micrograph of the microporous membrane of Example 1.

TABLE 2

| No. | Circle diameter μm | No. | Circle diameter μm | No. | Circle diameter μm | No. | Circle diameter μm | No. | Circle diameter μm |
|---|---|---|---|---|---|---|---|---|---|
| 1 | 0.108 | 21 | 0.167 | 41 | 0.176 | 61 | 0.186 | 81 | 0.186 |
| 2 | 0.118 | 22 | 0.167 | 42 | 0.176 | 62 | 0.186 | 82 | 0.186 |
| 3 | 0.127 | 23 | 0.167 | 43 | 0.176 | 63 | 0.186 | 83 | 0.186 |
| 4 | 0.127 | 24 | 0.167 | 44 | 0.176 | 64 | 0.186 | 84 | 0.186 |
| 5 | 0.137 | 25 | 0.167 | 45 | 0.176 | 65 | 0.186 | 85 | 0.186 |
| 6 | 0.147 | 26 | 0.167 | 46 | 0.176 | 66 | 0.186 | 86 | 0.186 |
| 7 | 0.147 | 27 | 0.167 | 47 | 0.176 | 67 | 0.186 | 87 | 0.186 |
| 8 | 0.147 | 28 | 0.167 | 48 | 0.176 | 68 | 0.186 | 88 | 0.186 |
| 9 | 0.147 | 29 | 0.167 | 49 | 0.176 | 69 | 0.186 | 89 | 0.191 |
| 10 | 0.157 | 30 | 0.167 | 50 | 0.176 | 70 | 0.186 | 90 | 0.196 |
| 11 | 0.157 | 31 | 0.167 | 51 | 0.176 | 71 | 0.186 | 91 | 0.196 |
| 12 | 0.157 | 32 | 0.167 | 52 | 0.176 | 72 | 0.186 | 92 | 0.196 |
| 13 | 0.157 | 33 | 0.167 | 53 | 0.186 | 73 | 0.186 | 93 | 0.196 |
| 14 | 0.157 | 34 | 0.167 | 54 | 0.186 | 74 | 0.186 | 94 | 0.196 |
| 15 | 0.157 | 35 | 0.167 | 55 | 0.186 | 75 | 0.186 | 95 | 0.196 |
| 16 | 0.157 | 36 | 0.167 | 56 | 0.186 | 76 | 0.186 | 96 | 0.196 |
| 17 | 0.157 | 37 | 0.167 | 57 | 0.186 | 77 | 0.186 | 97 | 0.196 |
| 18 | 0.157 | 38 | 0.176 | 58 | 0.186 | 78 | 0.186 | 98 | 0.196 |
| 19 | 0.157 | 39 | 0.176 | 59 | 0.186 | 79 | 0.186 | 99 | 0.196 |
| 20 | 0.157 | 40 | 0.176 | 60 | 0.186 | 80 | 0.186 | 100 | 0.196 |

TABLE 3

| No. | Circle diameter μm | No. | Circle diameter μm | No. | Circle diameter μm | No. | Circle diameter μm | No. | Circle diameter μm |
|---|---|---|---|---|---|---|---|---|---|
| 101 | 0.196 | 121 | 0.196 | 141 | 0.206 | 161 | 0.216 | 181 | 0.245 |
| 102 | 0.196 | 122 | 0.196 | 142 | 0.206 | 162 | 0.216 | 182 | 0.245 |
| 103 | 0.196 | 123 | 0.196 | 143 | 0.206 | 163 | 0.216 | | |
| 104 | 0.196 | 124 | 0.196 | 144 | 0.206 | 164 | 0.216 | | |
| 105 | 0.196 | 125 | 0.196 | 145 | 0.206 | 165 | 0.216 | | |
| 106 | 0.196 | 126 | 0.201 | 146 | 0.206 | 166 | 0.216 | | |
| 107 | 0.196 | 127 | 0.201 | 147 | 0.206 | 167 | 0.216 | | |
| 108 | 0.196 | 128 | 0.206 | 148 | 0.206 | 168 | 0.216 | | |
| 109 | 0.196 | 129 | 0.206 | 149 | 0.206 | 169 | 0.216 | | |
| 110 | 0.196 | 130 | 0.206 | 150 | 0.211 | 170 | 0.221 | | |
| 111 | 0.196 | 131 | 0.206 | 151 | 0.211 | 171 | 0.225 | | |
| 112 | 0.196 | 132 | 0.206 | 152 | 0.216 | 172 | 0.225 | | |
| 113 | 0.196 | 133 | 0.206 | 153 | 0.216 | 173 | 0.225 | | |
| 114 | 0.196 | 134 | 0.206 | 154 | 0.216 | 174 | 0.225 | | |
| 115 | 0.196 | 135 | 0.206 | 155 | 0.216 | 175 | 0.225 | | |
| 116 | 0.196 | 136 | 0.206 | 156 | 0.216 | 176 | 0.225 | | |
| 117 | 0.196 | 137 | 0.206 | 157 | 0.216 | 177 | 0.225 | | |
| 118 | 0.196 | 138 | 0.206 | 158 | 0.216 | 178 | 0.235 | | |
| 119 | 0.196 | 139 | 0.206 | 159 | 0.216 | 179 | 0.235 | | |
| 120 | 0.196 | 140 | 0.206 | 160 | 0.216 | 180 | 0.245 | | |

Table 4 shows the characteristics of the particle diameters of the spherical bodies of Example 1. The skin layer of the microporous membrane of Example 1 has an average particle diameter of the spherical bodies being 0.190 μm. Furthermore, 62% of the spherical bodies which correspond to 112 spherical bodies have particle diameters which fall within the ±10% range of the average particle diameter.

TABLE 4

| | |
|---|---|
| Number of spherical bodies | 182 spherical bodies |
| Maximum particle diameter | 0.245 μm |
| Minimum particle diameter | 0.108 μm |
| Average particle diameter | 0.190 μm |

TABLE 4-continued

| Diameter + 10% | 0.209168283 µm |
| --- | --- |
|  | 33 spherical bodies |
| Diameter − 10% | 0.171137686 µm |
|  | 37 spherical bodies |
| ±10% spherical bodies | 112 spherical bodies |
| Frequency distribution | 62% |

Table 5 shows a frequency distribution of the particle diameters of the spherical bodies. It is clear that the particle diameters concentrate in width of 0.05 µm (0.15 to 0.20 µm), and the spherical bodies have a uniform particle diameter.

TABLE 5

| Particle diameter µm | Distribution | Cumulative number |
| --- | --- | --- |
| 0.00 or more to less than 0.05 | 0 | 0 |
| 0.05 or more to less than 0.10 | 0 | 0 |
| 0.10 or more to less than 0.15 | 9 | 9 |
| 0.15 or more to less than 0.20 | 116 | 125 |
| 0.20 or more to less than 0.25 | 57 | 182 |
| 0.25 or more to less than 0.30 | 0 | 182 |

Table 6 to 10 show that the lengths of the linear joining parts 2 (distances between the perfect circles) determined by the scanning electron micrograph of the microporous membrane of Example 1.

TABLE 6

| No. | Length µm | No. | Length µm | No. | Length µm | No. | Length µm | No. | Length µm |
| --- | --- | --- | --- | --- | --- | --- | --- | --- | --- |
| 1 | 0.020 | 21 | 0.079 | 41 | 0.104 | 61 | 0.127 | 81 | 0.146 |
| 2 | 0.022 | 22 | 0.079 | 42 | 0.104 | 62 | 0.127 | 82 | 0.146 |
| 3 | 0.022 | 23 | 0.079 | 43 | 0.106 | 63 | 0.127 | 83 | 0.147 |
| 4 | 0.028 | 24 | 0.081 | 44 | 0.108 | 64 | 0.128 | 84 | 0.147 |
| 5 | 0.029 | 25 | 0.081 | 45 | 0.108 | 65 | 0.128 | 85 | 0.149 |
| 6 | 0.031 | 26 | 0.084 | 46 | 0.108 | 66 | 0.131 | 86 | 0.149 |
| 7 | 0.031 | 27 | 0.084 | 47 | 0.110 | 67 | 0.132 | 87 | 0.152 |
| 8 | 0.042 | 28 | 0.084 | 48 | 0.110 | 68 | 0.132 | 88 | 0.153 |
| 9 | 0.044 | 29 | 0.088 | 49 | 0.110 | 69 | 0.132 | 89 | 0.153 |
| 10 | 0.044 | 30 | 0.088 | 50 | 0.110 | 70 | 0.133 | 90 | 0.153 |
| 11 | 0.049 | 31 | 0.089 | 51 | 0.111 | 71 | 0.136 | 91 | 0.157 |
| 12 | 0.050 | 32 | 0.089 | 52 | 0.112 | 72 | 0.137 | 92 | 0.158 |
| 13 | 0.055 | 33 | 0.089 | 53 | 0.114 | 73 | 0.138 | 93 | 0.158 |
| 14 | 0.059 | 34 | 0.090 | 54 | 0.115 | 74 | 0.139 | 94 | 0.158 |
| 15 | 0.060 | 35 | 0.090 | 55 | 0.118 | 75 | 0.139 | 95 | 0.158 |
| 16 | 0.069 | 36 | 0.092 | 56 | 0.118 | 76 | 0.143 | 96 | 0.158 |
| 17 | 0.069 | 37 | 0.093 | 57 | 0.119 | 77 | 0.143 | 97 | 0.160 |
| 18 | 0.071 | 38 | 0.099 | 58 | 0.120 | 78 | 0.143 | 98 | 0.162 |
| 19 | 0.075 | 39 | 0.101 | 59 | 0.124 | 79 | 0.143 | 99 | 0.162 |
| 20 | 0.078 | 40 | 0.102 | 60 | 0.127 | 80 | 0.143 | 100 | 0.166 |

TABLE 7

| No. | Length µm | No. | Length µm | No. | Length µm | No. | Length µm | No. | Length µm |
| --- | --- | --- | --- | --- | --- | --- | --- | --- | --- |
| 101 | 0.167 | 121 | 0.176 | 141 | 0.185 | 161 | 0.196 | 181 | 0.206 |
| 102 | 0.167 | 122 | 0.177 | 142 | 0.186 | 162 | 0.196 | 182 | 0.206 |
| 103 | 0.167 | 123 | 0.177 | 143 | 0.186 | 163 | 0.196 | 183 | 0.206 |
| 104 | 0.167 | 124 | 0.178 | 144 | 0.187 | 164 | 0.197 | 184 | 0.206 |
| 105 | 0.167 | 125 | 0.178 | 145 | 0.187 | 165 | 0.198 | 185 | 0.207 |
| 106 | 0.167 | 126 | 0.178 | 146 | 0.187 | 166 | 0.198 | 186 | 0.207 |
| 107 | 0.167 | 127 | 0.179 | 147 | 0.187 | 167 | 0.199 | 187 | 0.207 |
| 108 | 0.167 | 128 | 0.180 | 148 | 0.187 | 168 | 0.201 | 188 | 0.207 |
| 109 | 0.167 | 129 | 0.180 | 149 | 0.188 | 169 | 0.201 | 189 | 0.208 |
| 110 | 0.167 | 130 | 0.180 | 150 | 0.188 | 170 | 0.201 | 190 | 0.208 |
| 111 | 0.169 | 131 | 0.180 | 151 | 0.190 | 171 | 0.202 | 191 | 0.208 |
| 112 | 0.171 | 132 | 0.181 | 152 | 0.190 | 172 | 0.202 | 192 | 0.210 |
| 113 | 0.171 | 133 | 0.181 | 153 | 0.190 | 173 | 0.202 | 193 | 0.210 |
| 114 | 0.171 | 134 | 0.182 | 154 | 0.193 | 174 | 0.202 | 194 | 0.210 |
| 115 | 0.171 | 135 | 0.183 | 155 | 0.193 | 175 | 0.202 | 195 | 0.210 |
| 116 | 0.171 | 136 | 0.183 | 156 | 0.193 | 176 | 0.202 | 196 | 0.210 |
| 117 | 0.171 | 137 | 0.183 | 157 | 0.193 | 177 | 0.205 | 197 | 0.210 |
| 118 | 0.175 | 138 | 0.184 | 158 | 0.193 | 178 | 0.205 | 198 | 0.210 |
| 119 | 0.175 | 139 | 0.184 | 159 | 0.195 | 179 | 0.205 | 199 | 0.211 |
| 120 | 0.175 | 140 | 0.185 | 160 | 0.196 | 180 | 0.205 | 200 | 0.212 |

TABLE 8

| No. | Length µm | No. | Length µm | No. | Length µm | No. | Length µm | No. | Length µm |
| --- | --- | --- | --- | --- | --- | --- | --- | --- | --- |
| 201 | 0.212 | 221 | 0.220 | 241 | 0.230 | 261 | 0.239 | 281 | 0.248 |
| 202 | 0.215 | 222 | 0.221 | 242 | 0.230 | 262 | 0.239 | 282 | 0.250 |
| 203 | 0.215 | 223 | 0.222 | 243 | 0.231 | 263 | 0.239 | 283 | 0.250 |
| 204 | 0.215 | 224 | 0.224 | 244 | 0.233 | 264 | 0.239 | 284 | 0.251 |
| 205 | 0.215 | 225 | 0.224 | 245 | 0.233 | 265 | 0.242 | 285 | 0.254 |
| 206 | 0.216 | 226 | 0.225 | 246 | 0.234 | 266 | 0.242 | 286 | 0.254 |
| 207 | 0.216 | 227 | 0.225 | 247 | 0.236 | 267 | 0.242 | 287 | 0.255 |
| 208 | 0.216 | 228 | 0.226 | 248 | 0.236 | 268 | 0.243 | 288 | 0.255 |
| 209 | 0.216 | 229 | 0.226 | 249 | 0.236 | 269 | 0.243 | 289 | 0.255 |
| 210 | 0.216 | 230 | 0.226 | 250 | 0.236 | 270 | 0.244 | 290 | 0.256 |
| 211 | 0.217 | 231 | 0.226 | 251 | 0.236 | 271 | 0.245 | 291 | 0.256 |
| 212 | 0.217 | 232 | 0.226 | 252 | 0.236 | 272 | 0.245 | 292 | 0.256 |
| 213 | 0.217 | 233 | 0.226 | 253 | 0.236 | 273 | 0.245 | 293 | 0.256 |
| 214 | 0.217 | 234 | 0.227 | 254 | 0.236 | 274 | 0.246 | 294 | 0.257 |
| 215 | 0.218 | 235 | 0.228 | 255 | 0.237 | 275 | 0.247 | 295 | 0.257 |
| 216 | 0.218 | 236 | 0.229 | 256 | 0.237 | 276 | 0.247 | 296 | 0.257 |
| 217 | 0.219 | 237 | 0.229 | 257 | 0.237 | 277 | 0.247 | 297 | 0.257 |
| 218 | 0.219 | 238 | 0.229 | 258 | 0.237 | 278 | 0.247 | 298 | 0.257 |
| 219 | 0.220 | 239 | 0.229 | 259 | 0.237 | 279 | 0.248 | 299 | 0.257 |
| 220 | 0.220 | 240 | 0.229 | 260 | 0.237 | 280 | 0.248 | 300 | 0.257 |

TABLE 9

| No. | Length µm | No. | Length µm | No. | Length µm | No. | Length µm | No. | Length µm |
| --- | --- | --- | --- | --- | --- | --- | --- | --- | --- |
| 301 | 0.257 | 321 | 0.268 | 341 | 0.280 | 361 | 0.292 | 381 | 0.314 |
| 302 | 0.257 | 322 | 0.268 | 342 | 0.280 | 362 | 0.294 | 382 | 0.314 |
| 303 | 0.258 | 323 | 0.268 | 343 | 0.281 | 363 | 0.294 | 383 | 0.314 |
| 304 | 0.258 | 324 | 0.269 | 344 | 0.281 | 364 | 0.298 | 384 | 0.318 |
| 305 | 0.259 | 325 | 0.271 | 345 | 0.284 | 365 | 0.300 | 385 | 0.319 |
| 306 | 0.259 | 326 | 0.271 | 346 | 0.285 | 366 | 0.302 | 386 | 0.319 |
| 307 | 0.259 | 327 | 0.272 | 347 | 0.285 | 367 | 0.302 | 387 | 0.320 |
| 308 | 0.260 | 328 | 0.273 | 348 | 0.285 | 368 | 0.305 | 388 | 0.324 |
| 309 | 0.260 | 329 | 0.273 | 349 | 0.285 | 369 | 0.305 | 389 | 0.324 |
| 310 | 0.260 | 330 | 0.273 | 350 | 0.285 | 370 | 0.306 | 390 | 0.328 |
| 311 | 0.261 | 331 | 0.273 | 351 | 0.286 | 371 | 0.307 | 391 | 0.330 |
| 312 | 0.261 | 332 | 0.275 | 352 | 0.286 | 372 | 0.308 | 392 | 0.330 |
| 313 | 0.263 | 333 | 0.275 | 353 | 0.287 | 373 | 0.308 | 393 | 0.334 |
| 314 | 0.264 | 334 | 0.275 | 354 | 0.288 | 374 | 0.308 | 394 | 0.335 |
| 315 | 0.264 | 335 | 0.276 | 355 | 0.290 | 375 | 0.308 | 395 | 0.338 |
| 316 | 0.264 | 336 | 0.276 | 356 | 0.290 | 376 | 0.310 | 396 | 0.340 |
| 317 | 0.265 | 337 | 0.277 | 357 | 0.290 | 377 | 0.312 | 397 | 0.341 |
| 318 | 0.265 | 338 | 0.279 | 358 | 0.291 | 378 | 0.312 | 398 | 0.343 |
| 319 | 0.265 | 339 | 0.279 | 359 | 0.291 | 379 | 0.313 | 399 | 0.343 |
| 320 | 0.266 | 340 | 0.280 | 360 | 0.291 | 380 | 0.313 | 400 | 0.343 |

TABLE 10

| No. | Length µm | No. | Length µm |
| --- | --- | --- | --- |
| 401 | 0.343 | 421 | 0.469 |
| 402 | 0.348 | 422 | 0.474 |
| 403 | 0.353 | 423 | 0.499 |
| 404 | 0.355 | 424 | 0.500 |
| 405 | 0.366 | 425 | 0.519 |
| 406 | 0.366 | 426 | 0.531 |

TABLE 10-continued

| No. | Length μm | No. | Length μm |
|---|---|---|---|
| 407 | 0.373 | 427 | 0.580 |
| 408 | 0.373 | | |
| 409 | 0.376 | | |
| 410 | 0.378 | | |
| 411 | 0.381 | | |
| 412 | 0.383 | | |
| 413 | 0.384 | | |
| 414 | 0.386 | | |
| 415 | 0.402 | | |
| 416 | 0.410 | | |
| 417 | 0.417 | | |
| 418 | 0.425 | | |
| 419 | 0.442 | | |
| 420 | 0.446 | | |

Table 11 shows the characteristics of the linear joining parts of Example 1. The skin layer of the microporous membrane of Example 1 has an average length of linear joining parts being 0.219 μm. Furthermore, 61% of the joining parts which correspond to 259 joining parts have lengths which fall within the ±30% range of the average length.

TABLE 11

| | |
|---|---|
| Number | 427 linear joining parts |
| Average length | 0.219 μm |
| Average + 30% | 0.285064832 μm |
| | 78 linear joining parts |
| Average − 30% | 0.153496448 μm |
| | 90 linear joining parts |
| Number of linear joining parts within 30% | 259 linear joining parts |
| Distribution frequency | 61% |

Table 12 shows a frequency distribution of the linear joining parts. The frequency distribution shows an increase followed by a decrease with the peak at the range between 0.20 and 0.25 μm, and that the lengths of the joining parts concentrate in a particular range.

TABLE 12

| Length μm | Distribution | Cumulative number |
|---|---|---|
| 0.00 or more to less than 0.05 | 11 | 11 |
| 0.05 or more to less than 0.10 | 27 | 38 |
| 0.10 or more to less than 0.15 | 48 | 86 |
| 0.15 or more to less than 0.20 | 81 | 167 |
| 0.20 or more to less than 0.25 | 114 | 281 |
| 0.25 or more to less than 0.30 | 83 | 364 |
| 0.30 or more to less than 0.35 | 38 | 402 |
| 0.35 or more to less than 0.40 | 12 | 414 |
| 0.40 or more to less than 0.45 | 6 | 420 |
| 0.45 or more to less than 0.50 | 3 | 423 |
| 0.50 or more to less than 0.55 | 3 | 426 |
| 0.55 or more to less than 0.60 | 1 | 427 |

Table 13 shows the average particle diameters of the spherical bodies, average distances of the center to center distances between the spherical bodies and the average lengths of the joining parts of Examples 1 to 8.

TABLE 13

| | Spherical bodies | | Center to center distances | | Joining parts | |
|---|---|---|---|---|---|---|
| | Average diameter (μm) | Distribution frequency (%) | Average distance (μm) | Distribution frequency (%) | Average length (μm) | Distribution frequency (%) |
| Example 1 | 0.190 | 62 | 0.299 | 79 | 0.219 | 61 |
| Example 2 | 0.205 | 81 | 0.310 | 86 | 0.226 | 59 |
| Example 3 | 0.185 | 73 | 0.284 | 77 | 0.214 | 62 |
| Example 4 | 0.170 | 73 | 0.244 | 75 | 0.231 | 46 |
| Example 5 | 0.147 | 63 | 0.198 | 89 | 0.175 | 36 |
| Example 6 | 0.189 | 72 | 0.298 | 79 | 0.212 | 55 |
| Example 7 | 0.189 | 74 | 0.293 | 90 | 0.199 | 48 |
| Example 8 | 0.177 | 49 | 0.244 | 97 | 0.156 | 45 |

Use of the terms "a," "an," "the" and similar referents used in the context in explanation of the invention (particularly in the context of claims as described below) is to be construed to cover both the singular form and the plural form, unless otherwise indicated herein or clearly contradicted by context. The terms "comprising," "having," "including" and "containing" are to be construed as open-ended terms (more specifically, meaning "including, but not limited to") unless otherwise noted. Recitation of ranges of values herein are merely intended to serve as a shorthand method of referring individually to each separate value falling within the range, unless otherwise indicated herein, and each separate value is incorporated herein as if it were individually recited herein. All methods described herein can be performed in any suitable order unless otherwise indicated herein or otherwise clearly contradicted by context. The use of any and all examples, or exemplary language ("such as") provided herein, is intended merely to better illuminate the invention and does not pose a limitation on the scope of the invention unless otherwise claimed. No language herein should be construed as indicating any non-claimed element as essential to the practice of the invention.

Preferred embodiments of the invention are described herein, including the best mode known to the present inventors for carrying out the invention. Variations of the preferred embodiments may become apparent to those skilled in the art upon reading the foregoing description. The present inventors expect skilled artisans to employ such variations as appropriate, and the present inventors intend for the invention to be practiced otherwise than as specifically described herein. Accordingly, the invention includes all modifications and equivalents of the subject matter recited in the claims appended hereto as permitted by applicable law. Moreover, any combination of the elements in all possible variations thereof is encompassed by the invention unless otherwise indicated herein or otherwise clearly contradicted by context.

DESCRIPTION OF REFERENCE NUMERALS AND SYMBOLS

1 Spherical Body
2 Linear Joining Part

What is claimed is:
1. Microporous membrane being an asymmetric membrane, comprising:
   a skin layer where micropores are formed;
   a support layer which supports the skin layer and in which pores larger than the micropores are formed; and a substrate layer which supports the support layer, wherein the substrate layer is nonwoven fabric having a fabric weight between 30 and 70 g/m$^2$, wherein a material of the microporous membrane is a polyvinylidene fluoride-based resin, wherein a weight-average molecular weight (Mw) of the polyvinylidene fluoride-based resin is about 800,000, wherein the skin layer has a plurality of spherical bodies, and a plurality of linear joining parts extending three-dimensionally from each of the spherical bodies, and wherein the adjacent spherical bodies are connected to each other by the linear joining parts to form a three-dimensional network structure where the spherical bodies serve as intersections.

2. The microporous membrane of claim 1, having a frequency distribution where 45% or more of the particle diameters of the spherical bodies are within the ±10% range of an average particle diameter.

3. The microporous membrane of claim 1, having a frequency distribution where 35% or more of the lengths of the joining parts are within the ±30% range of an average length.

4. The microporous membrane of claim 1, wherein the spherical bodies have an average particle diameter of 0.05 to 0.5 µm.

5. The microporous membrane of claim 1, wherein as for a solution of a polyvinylidene fluoride-based resin dissolved in a good solvent, a graph with shear rate as the abscissa and a reciprocal of viscosity of the solution as the ordinate includes a curve having an arc of convex upward.

6. The microporous membrane of claim 1, wherein as for a solution of 10 parts by weight of the polyvinylidene fluoride-based resin, 10 parts by weight of polyethylene glycol and 80 parts by weight of dimethylacetamide, a graph with shear rate as the abscissa and a reciprocal of viscosity of the solution as the ordinate can be approximately correlated by a quadratic function in the region of the shear rate of 40 per second or smaller with a quadratic coefficient of the quadratic function being smaller than $-10^{-8}$.

7. The microporous membrane of claim 1, wherein a thickness of the skin layer is 0.5 to 10 µm, and a thickness of the support layer is 20 to 500 µm.

8. The microporous membrane of claim 1, having a frequency distribution where 45% or more of the particle diameters of the spherical bodies are within the ±10% range of an average particle diameter, and having a frequency distribution where 35% or more of the lengths of the joining parts are within the ±30% range of an average length.

9. The microporous membrane of claim 1, wherein as for a solution of 10 parts by weight of the polyvinylidene fluoride-based resin, 10 parts by weight of polyethylene glycol and 80 parts by weight of dimethylacetamide, a graph with shear rate as the abscissa and a reciprocal of viscosity of the solution as the ordinate can be approximately correlated by a quadratic function in the region of the shear rate of 40 per second or smaller with a quadratic coefficient of the quadratic function being smaller than $-10^{-8}$.

\* \* \* \* \*